United States Patent
Futa et al.

(10) Patent No.: US 6,611,597 B1
(45) Date of Patent: Aug. 26, 2003

(54) METHOD AND DEVICE FOR CONSTRUCTING ELLIPTIC CURVES

(75) Inventors: Yuichi Futa, Osaka (JP); Atsuko Miyaji, Ishikawa-ken (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/490,785

(22) Filed: Jan. 24, 2000

(30) Foreign Application Priority Data

Jan. 25, 1999 (JP) .......................... 11-015592

(51) Int. Cl.[7] .............................. H04L 9/30; G06F 7/58
(52) U.S. Cl. ......................... 380/30; 380/28; 708/492
(58) Field of Search ........................... 380/30, 28, 44; 708/490, 491, 492

(56) References Cited

U.S. PATENT DOCUMENTS 5,146,500 A  * 9/1992 Maurer ........................ 380/30
6,141,420 A  * 10/2000 Vanstone et al. ............. 380/30
6,307,935 B1 * 10/2001 Crandall et al. ............. 380/28

OTHER PUBLICATIONS

"Finding Good Random Elliptic Curves for Cryptosystems Defined Over $IF_{2^n}$", by R. Lercier, Eurocrypt '97, Lecture Notes in Computer Science 1233 (1997), Springer Verlag, pp. 379–392.

* cited by examiner

Primary Examiner—Matthew Smithers

(57) ABSTRACT

A random number generating unit generates a random number t. An elliptic curve setting unit defines an elliptic curve E: $y^2=x^3-3x+t$. An elliptic curve finitude judging unit judges whether orders m1 and m2 of respective elliptic curves Ep1 and Ep2 produced by reducing the elliptic curve E on a rational number field modulo primes p1 and p2 are relatively prime. An elliptic curve order computing unit computes an order of the elliptic curve E. An elliptic curve condition judging unit judges the security of the elliptic curve E based on the computed order.

24 Claims, 10 Drawing Sheets

507 INFORMATION STORING UNIT

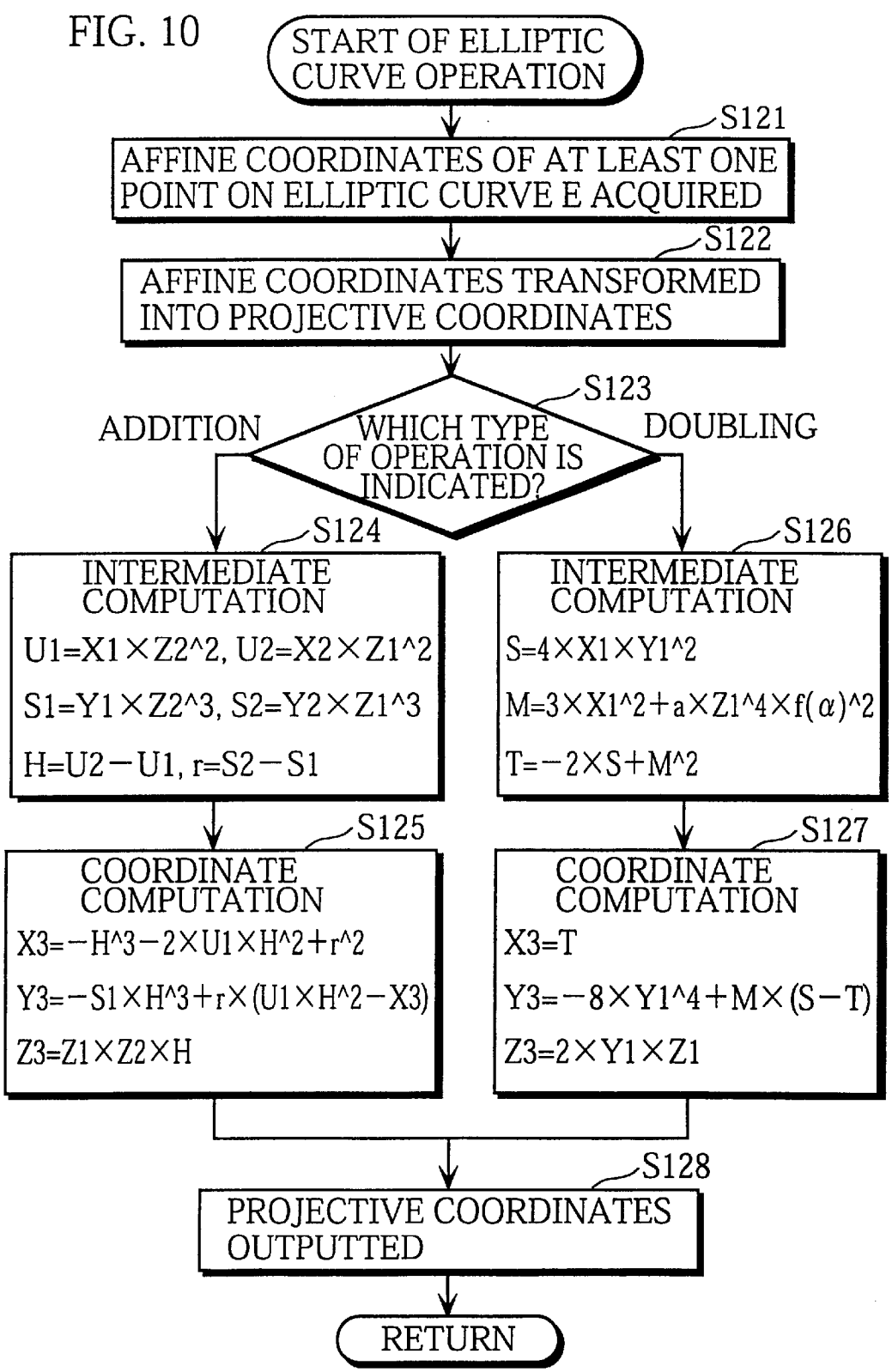

METHOD AND DEVICE FOR CONSTRUCTING ELLIPTIC CURVES

This application is based on an application No. H11-15592 filed in Japan, the content of which is hereby incorporated by reference.

BACKGROUND OF THE INVENTION

1. Field of the Invention

The present invention relates to elliptic curve arithmetic operation techniques and elliptic curve application techniques.

2. Description of the Prior Art

In recent years, the use of elliptic curves is becoming popular in the encrypted communications technology. Cryptosystems that employ elliptic curves rely for their security on the difficulty of solving a discrete logarithm problem.

Representative examples of the discrete logarithm problem are problems based on finite fields and problems based on elliptic curves. Such problems are described in detail in Neal Koblitz, *A Course in Number Theory and Cryptography*, Springer-Verlag (1987).

Elliptic Curve Discrete Logarithm Problem

The elliptic curve discrete logarithm problem is the following.

Let $E(GF(p))$ be an elliptic curve defined over a finite field $GF(p)$, with a point G on the elliptic curve E, given when the order of E is divisible by a large prime, being set as a base point. Here, "the order of the elliptic curve" means the number of points on the elliptic curve whose coordinates are in $GF(p)$. This being so, the problem is to find an integer x such that $$Y=xG$$

where Y is a given point on E, if such an integer x exists. Here, p is a prime and $GF(p)$ contains p elements.

Conditions for Secure Elliptic Curves

Given that various cryptanalysis attacks against elliptic curve discrete logarithm problems have been devised over the years, it is of great importance to construct a secure elliptic curve to strengthen the elliptic curve cryptosystem against these attacks.

In this specification, "constructing an elliptic curve" roughly means to determine the parameters a and b of an elliptic curve which is given by an equation $$y^2=x^3+ax+b$$

where the sign ^ represents a repeated multiplication, such as $x^3=x \times x \times x$.

To be secure against all existing cryptanalysis attacks, an elliptic curve over the finite field $GF(p)$ must satisfy the conditions:

(a) the order of the elliptic curve is not equal to any of p−1, p, and p+1; and (b) the order of the elliptic curve has a large prime factor.

In other words, checking the order of the elliptic curve allows the security of the elliptic curve to be assessed.

According to T. Okamoto & K. Ohta Encryption, *Zero Knowledge Proof, and Number Theory*, Kyoritsu (1995), pp.155~156, when the above conditions are satisfied, computation time required to solve the elliptic curve discrete logarithm problem is exponential time in the largest prime factor of the elliptic curve order.

Methods of Constructing Elliptic Curves

There are mainly two elliptic curve construction methods that are:

① elliptic curve construction using the CM (Complex Multiplication) method; and

② elliptic curve construction using an order computation algorithm.

Although ① can construct an elliptic curve easily, it cannot choose an elliptic curve at random. For details of this method, see A. Miyaji "On Ordinary Elliptic Curve Cryptosystems" *ASIACRYPT*'91, Springer-Verlag (1991), pp.460~469. Meanwhile, ② can construct a random elliptic curve, though it takes considerable time to do so.

Prior Art Example 1

Elliptic Curve Construction using an Order Computation Algorithm

The following introduces the method of constructing an elliptic curve using an algorithm to compute the order of the elliptic curve, with reference to FIG. 1. For details on this method, see N. Koblitz "Elliptic Curve Implementation of Zero-Knowledge Blobs" *J. Cryptology*, vol.4, no.3 (1991), pp.207~213.

First, a random number is generated (S901), and parameters which define the elliptic curve are generated using the random number (S902). Next, the order of the elliptic curve is computed using the generated parameters (S903). The computed order is checked whether it satisfies one or more predetermined conditions for secure elliptic curves, to assess the security of the elliptic curve (S904). If and only if the order satisfies the conditions, the generated elliptic curve parameters are outputted. If the order does not satisfy the conditions, the procedure returns to step S901 to repeat the random number generation, the parameter generation, the order computation, and the security judgement, until an elliptic curve whose order satisfies the conditions in step S904 is found.

This method which employs an order computation algorithm requires long computation time. Especially, it takes much time to compute the order of the elliptic curve.

One example of algorithms used to compute orders of elliptic curves is an algorithm proposed by Schoof. This algorithm is a polynomial time algorithm. The polynomial time algorithm referred to here is an algorithm whose computation time is polynomial time. The computation time of Schoof's algorithm per se is not practical.

Prior Art Example 2

Elliptic Curve Order Computation according to the SEA Algorithm

Atkin and Elkies have proposed several improvements of Schoof's algorithm and so have designed the SEA (Schoof-Elkies-Atkin) algorithm.

This algorithm is detailed in R. Lercier & F. Morain "Counting the Number of Points on Elliptic Curves over Finite Fields: Strategies and Performances" *EUROCRYPT*'95, Springer-Verlag (1995), pp.79~94.

The SEA algorithm computes $t \bmod L^n$ ($n=1, 2, 3, \ldots$). This can be done by calculating an eigenvalue of a map called the Frobenius map. More specifically, k is found from an equation $$(\alpha^p, \beta^p)=k(\alpha,\beta)$$

where $(\alpha,\beta)$ is an L-division point on an elliptic curve E and $k(\alpha,\beta)$ is a point on E after exponentiating the point $(\alpha,\beta)$ by k. This is carried out through computation on the elliptic curve E on a residue class ring of polynomials in variable $\alpha$ and $\beta$ with elements of GF(p) as coefficients, the moduli of the ring being polynomials $\beta^2-f(\alpha)$ and $h(\alpha)$. Computational complexity of the inversion of a polynomial is greater than computational complexity of the multiplication of a polynomial, so that a 3-tuple coordinate is used in this computation. Here, projective coordinate is employed as the 3-tuple coordinate, as the projective coordinate has been conventionally used for elliptic curves over finite fields. Conventional projective coordinate is described in Miyaji, Ono & Cohen "Efficient Elliptic Curve Exponentiation" *Advances in Cryptology-Proceedings of ICICS'97*, Lecture Notes in Computer Science, Springer-Verlag (1997), pp.282–290.

Prior Art Example 3

Calculation of the Exponentiation Point $k(\alpha,\beta)$ on the Elliptic Curve E Exponentiating the point $(\alpha,\beta)$ on the elliptic curve E by k is done by splitting the exponentiation into additions and doublings and performing the additions and the doublings in the following way.

Suppose $(\alpha,\beta)$ is transformed to $(\alpha{:}\beta{:}1)$, and $(\alpha{:}\beta{:}1)$ is interpreted as $(X(\alpha){:}\beta\times Y(\alpha){:}Z(\alpha))$ (where $X(\alpha)=\alpha$ and $Y(\alpha)=Z(\alpha)=1$).

Note here that "( , )" and "( : : )" represent affine coordinates and projective coordinates, respectively.

Assume $$P1=(X1(\alpha){:}\beta\times Y1(\alpha){:}Z1(\alpha))$$

$$P2=(X2(\alpha){:}\beta\times Y2(\alpha){:}Z2(\alpha))$$

$$P3=P1+P2=(X3(\alpha){:}\beta\times Y3(\alpha){:}Z3(\alpha))$$

In this specification, the operators $\times$ and $*$ in an addition formula or a doubling formula both denote a multiplication. In the addition formula or the doubling formula, a multiplication which appears for the first time in the formula is expressed by the operator $*$, whereas a multiplication which has already appeared is expressed by the operator $\times$. The number of multiplications in the addition or doubling formula can be obtained by counting the number of operators $*$ in the formula.

(1) Addition Formula

When $P1\neq\pm P2$, addition is required, the formula of which is $$X3=v*A$$

$$Y3=u*(v^2\times X1\times Z2-A)-v^3*(Y1\times Z2)$$

$$Z3=v^3*(Z1\times Z2)$$

where $$u = Y2*Z1 - Y1*Z2$$

$$v = X2*Z1 - X1*Z2$$

$$\begin{aligned}A &= u^2\times f(\alpha)\times Z1\times Z2 - v^3 - 2\times v^2\times X1\times Z2\\&= ((u*u)*f(\alpha))*(Z1*Z2) - (v*v)*v - 2\times v^2*(X1\times Z2)\end{aligned}$$

and $$f(x)=x^3+ax+b$$

It is to be noted that, although X1, Y1, Z1, X2, Y2, Z2, X3, Y3, Z3, u, v, and A are polynomials in the variable $\alpha$ and therefore should be written like $X1(\alpha)$, $Y1(\alpha)$, and $Z1(\alpha)$ to be precise, $(\alpha)$ has been omitted here for convenience in writing.

(2) Doubling Formula

When $P1=P2$, doubling is required, the formula of which is $$X3 = 2\times h*(s\times f(\alpha))$$

$$\begin{aligned}Y3 &= w\times(4\times B - h) - 8\times Y1^2\times s^2\times f(\alpha)^2\\&= w*(4\times B - h) - 8\times(Y1\times s\times f(\alpha))*(Y1\times s\times f(\alpha))\end{aligned}$$

$$\begin{aligned}Z3 &= 8\times s^3\times f(\alpha)^2\\&= 8\times s*(s\times f(\alpha))*(s\times f(\alpha))\end{aligned}$$

where $$\begin{aligned}w &= a\times Z1^2 + 3\times X1^2\\&= a\times(Z1*Z1) + 3\times(X1*X1)\end{aligned}$$

$$s = Y1*Z1$$

$$B = X1*(Y1*(s*f(\alpha)))$$

$$\begin{aligned}h &= w^2 - 8\times B\\&= w*w - 8\times B\end{aligned}$$

and $$f(x)=x^3+ax+b$$

As with the addition formula, though X1, Y1, Z1, X3, Y3, Z3, w, s, B, and h are polynomials in the variable $\alpha$, $(\alpha)$ is omitted for convenience in writing.

The number of multiplications is 15 in the addition formula and 12 in the doubling formula, as can be seen from the number of operators $*$ in each of the formulas. When computational complexity of a polynomial multiplication is measured as 1×PMul, the computational complexity of the addition is 15×PMul and the computational complexity of the doubling is 12×PMul.

In counting the number of multiplications, computational complexity of multiplying a constant and a polynomial, such as $a\times(Z1^2)$ or $3\times(X1^2)$, is smaller than computational complexity of multiplying a polynomial and a polynomial, so that such a multiplication is ignored in the counting. Likewise, a multiplication which has once appeared does not have to be calculated again because the previous multiplication result can be used, so that such a multiplication is ignored in the counting.

Prior Art Example 4

Elliptic Curve Construction based on the SEA Algorithm)

A method of constructing elliptic curves using -the SEA algorithm is proposed in pp. 379~392 in R. Lercier "Finding Good Random Elliptic Curves for Cryptosystems Defined over F(2^n)" *Advances in Cryptology-Proceedings of EUROCRYPT'97, Lecture Notes in Computer Science,* 1233, Springer-Verlag (1997) (hereinafter referred to as "document 1"). In this method the predetermined conditions used in the elliptic curve construction of prior art example 1 are defined as "the order of the elliptic curve is a prime".

Lercier's elliptic curve construction method which employs the SEA algorithm is described below with reference to FIGS. 2 and 3.

Let p be a prime which is an input value. Also, let E be an elliptic curve over a finite field GF(p) and E' be the quadratic twist of E. Then there is the relationship that, if the order of E is p+1−t, the order of E' is p+1+t.

First, an element u of the finite field GF(p) is chosen at random (S931), and parameters of the elliptic curve E are determined based on the element u (S932). Then, flags flag#ell and flag#twist are both set at an initial value 1 (S933).

Next, the order of E and the order of E' are calculated according to the SEA algorithm (S934).

If the order of E is divisible by L (S935), flag#ell is changed to 0 (S936), whereas if the order of E' is divisible by L (S937), flag#twist is changed to 0 (S938). When flag#ell=0 and flag#twist=0 (S940), the procedure returns to step S931. Otherwise, the procedure proceeds to step S941.

When flag#ell=1 (S941), it is judged whether the order of E is prime (S942). If the order of E is prime, the procedure proceeds to step S945. If the order of E is not prime, it is judged whether flag#twist=1 (S943). When flag#twist≠1, the procedure returns to step S931. When flag#twist=1, it is judged whether the order of E' is prime (S944). If the order of E' is not prime, the procedure returns to step S931. If the order of E' is prime, the procedure proceeds to step S945.

It is judged in step S945 whether the order of E is equal to p. If the order is equal to p, the procedure returns to step S931. If the order is not equal to p, the parameters of the elliptic curve E are outputted (S946).

In Lercier's elliptic curve construction, step S933 is used to accelerate computation, thereby reducing computation time needed for the SEA algorithm. Nevertheless, since in step S932 the parameters of the elliptic curve E are determined without consideration given to the possibility that the order of the elliptic curve E is not prime, the order computation according to the SEA algorithm in step S934 may have to be repeated again and again. This causes an increase in overall computational complexity.

Thus, despite the fact that Schoof's order computation algorithm in elliptic curve construction has been modified as the SEA algorithm and improvements to reduce computational complexity of the SEA algorithm have been proposed by Lercier, there still remains the demand to further reduce computational complexity for elliptic curves.

SUMMARY OF THE INVENTION

The first object of the invention is to provide an elliptic curve arithmetic operation device that can compute points on an elliptic curve with small computational complexity.

The second object of the invention is to provide an elliptic curve order computation device that can compute an order of an elliptic curve with small computational complexity.

The third object of the invention is to provide an elliptic curve construction device that can construct a highly secure elliptic curve with small computational complexity.

The fourth object of the invention is to provide an elliptic curve application device that uses a highly secure elliptic curve constructed with small computational complexity.

The first object can be fulfilled by an elliptic curve arithmetic operation device for performing one of an addition and a doubling on an elliptic curve E: $y^2=f(x)$ on a residue class ring of polynomials in two variables $\alpha$ and $\beta$, moduli of the residue class ring being polynomials $\beta^2-f(\alpha)$ and $h(\alpha)$, where $f(\alpha)=\alpha^3+a\alpha+b$, a and b are constants, and $h(\alpha)$ is a polynomial in the variable $\alpha$, the elliptic curve arithmetic operation device including: an acquiring unit for acquiring affine coordinates of at least one point on the elliptic curve E and operation information indicating one of the addition and the doubling, from an external source; a transforming unit for performing a coordinate transformation on the acquired affine coordinates to generate Jacobian coordinates, the coordinate transformation being transforming affine coordinates $(\phi(\alpha),\beta\times\Phi(\alpha))$ of a given point on the elliptic curve E using polynomials $$X(\alpha)=f(\alpha)\times\phi(\alpha)$$

$$Y(\alpha)=f(\alpha)^2\times\Phi(\alpha)$$

$$Z(\alpha)=1$$

into Jacobian coordinates $(X(\alpha):Y(\alpha):\beta\times Z(\alpha))$, $\phi(\alpha)$ and $\Phi(\alpha)$ being polynomials; and an operating unit for performing one of the addition and the doubling indicated by the acquired operation information, on the generated Jacobian coordinates to obtain Jacobian coordinates of a point on the elliptic curve E.

Here, the acquiring unit may in a first case acquire affine coordinates of two different points on the elliptic curve E and operation information indicating the addition and in a second case acquire affine coordinates of a single point on the elliptic curve E and operation information indicating the doubling, wherein the transforming unit in the first case performs the coordinate transformation on the acquired affine coordinates of the two different points to generate Jacobian coordinates of the two different points and in the second case performs the coordinate transformation on the acquired affine coordinates of the single point to generate Jacobian coordinates of the single point, and the operating unit in the first case performs the addition indicated by the acquired operation information on the generated Jacobian coordinates of the two different points to obtain the Jacobian coordinates of the point on the elliptic curve E and in the second case performs the doubling indicated by the acquired operation information on the generated Jacobian coordinates of the single point to obtain the Jacobian coordinates of the point on the elliptic curve E.

Here, the acquiring unit may in the first case acquire affine coordinates $(X1(\alpha),\beta\times Y1(\alpha))$ $(X2(\alpha),\beta\times Y2(\alpha))$ of the two different points on the elliptic curve E and the operation information indicating the addition and in the second case acquire affine coordinates $(X1(\alpha),\beta\times Y1(\alpha))$ of the single point on the elliptic curve E and the operation information indicating the doubling, wherein the transforming unit in the first case performs the coordinate transformation on the acquired affine coordinates of the two different points to generate Jacobian coordinates $(X1(\alpha):Y1(\alpha):\beta\times Z1(\alpha))$ $(X2(\alpha):Y2(\alpha):\beta\times Z2(\alpha))$ of the two different points and in the second case performs the coordinate transformation on the acquired affine coordinates of the single point to generate Jacobian coordinates $(X1(\alpha):Y1(\alpha):\beta\times Z1(\alpha))$ of the single point, and the operating unit in the first case computes $$U1(\alpha)=X1(\alpha)\times Z2(\alpha)^2$$

$$U2(\alpha)=X2(\alpha)\times Z1(\alpha)^2$$

$$S1(\alpha)=Y1(\alpha)\times Z2(\alpha)^3$$

$$S2(\alpha)=Y2(\alpha)\times Z1(\alpha)^3$$

$$H(\alpha)=U2(\alpha)-U1(\alpha)$$

$$r(\alpha)=S2(\alpha)-S1(\alpha)$$

and computes $$X3(\alpha)=-H(\alpha)^3-2\times U1(\alpha)\times H(\alpha)^2+r(\alpha)^2$$

$$Y3(\alpha)=-S1(\alpha)\times H(\alpha)^3+r(\alpha)\times(U1(\alpha)\times H(\alpha)^2-X3(\alpha))$$

$$Z3(\alpha)=Z1(\alpha)\times Z2(\alpha)\times H(\alpha)$$

to obtain Jacobian coordinates $(X3(\alpha):Y3(\alpha):\beta\times Z3(\alpha))$ of the point on the elliptic curve E, and in the second case computes $$S(\alpha)=4\times X1(\alpha)\times Y1(\alpha)^2$$

$$M(\alpha)=3\times X1(\alpha)^2+a\times Z1(\alpha)^4\times f(\alpha)^2$$

$$T(\alpha)=-2\times S(\alpha)+M(\alpha)^2$$

and computes $$X3(\alpha)=T(\alpha)$$

$$Y3(\alpha)=-8\times Y1(\alpha)^4+M(\alpha)\times(S(\alpha)-T(\alpha))$$

$$Z3(\alpha)=2\times Y1(\alpha)\times Z1(\alpha)$$

to obtain the Jacobian coordinates $(X3(\alpha):Y3(\alpha):\beta\times Z3(\alpha))$ of the point on the elliptic curve E.

With the above construction, computational complexity for polynomial multiplications in the addition increases by 1×PMul and computational complexity for polynomial multiplications in the doubling decreases by 2×PMul, when compared with the prior art. Given that generally the doubling is more frequently repeated than the addition, the decrease in computational complexity of the doubling greatly contributes to a reduction in overall computational complexity in the elliptic curve arithmetic operation device.

The second object can be fulfilled by an elliptic curve order computation device for computing an order of an elliptic curve according to a Schoof-Elkies-Atkin algorithm, the elliptic curve order computation device including the above elliptic curve arithmetic operation device.

With this construction, computational complexity for polynomial multiplications in the addition increases by 1×PMul and computational complexity for polynomial multiplications in the doubling decreases by 2×PMul, when compared with the prior art. Given that generally the doubling is more frequently repeated than the addition, the decrease in computational complexity of the doubling greatly contributes to a reduction in overall computational complexity in the elliptic curve order computation device.

The third object can be fulfilled by an elliptic curve construction device for determining parameters of an elliptic curve E which is defined over a finite field GF(p) and offers a high level of security, p being a prime, the elliptic curve construction device including: a random number generating unit for generating a random number; a parameter generating unit for selecting the parameters of the elliptic curve E using the generated random number, in such a manner that a probability of a discriminant of the elliptic curve E having any square factor is lower than a predetermined threshold value; a finitude judging unit for judging whether the elliptic curve E defined by the selected parameters has any point whose order is finite on a rational number field; an order computing unit for computing an order m of the elliptic curve E when the finitude judging unit judges that the elliptic curve E does not have any point whose order is finite on the rational number field; a security judging unit for judging whether a condition that the computed order m is a prime not equal to the prime p is satisfied; a repeat controlling unit for controlling the random number generating unit, the parameter generating unit, the finitude judging unit, the order computing unit, and the security judging unit respectively to repeat random number generation, parameter selection, finitude judgement, order computation, and security judgement until the condition is satisfied; and a parameter outputting unit for outputting the selected parameters when the condition is satisfied.

With this construction, the parameter generating unit is likely to select a secure elliptic curve beforehand, so that the processes of selecting an elliptic curve and testing its security do not have to be repeated over and over again. As a result, overall computational complexity in the elliptic curve construction device is reduced.

Also, the finitude judging unit assesses the security of the elliptic curve by judging whether the elliptic curve has a point with a finite order, before the order of the elliptic curve is computed. If the elliptic curve is judged as not being secure, the elliptic curve is rejected without the order thereof being computed. Accordingly, unnecessary calculation of the order is avoided and the overall computational complexity in the elliptic curve construction device is reduced.

Here, the elliptic curve E may be expressed as $y^2=x^3+ax+b$ where parameters a and b are constants, wherein the parameter generating unit selects $-3$ and the random number respectively as the parameters a and b so that the probability of the discriminant of the elliptic curve E having any square factor is lower than the predetermined threshold value.

With this construction, the parameter generating unit selects the elliptic curve E: $y^2=x^3-3x+b$ which is highly secure beforehand, so that the processes of selecting an elliptic curve and testing its security do not have to be repeated over and over again. Accordingly, the overall computational complexity in the elliptic curve construction device is reduced.

Here, the finitude judging unit may, given two primes p1 and p2 beforehand where p1≠p2, interpret the elliptic curve E as an elliptic curve EQ on the rational number field, compute orders m1 and m2 of respective elliptic curves Ep1 and Ep2 which are produced by reducing the elliptic curve EQ modulo p1 and p2, judge whether the orders m1 and m2 are relatively prime, and, if the orders m1 and m2 are relatively prime, judge that the elliptic curve E does not have any point whose order is finite on the rational number field.

With this construction, the finitude judging unit assesses the security of the elliptic curve by judging whether the orders m1 and m2 of the elliptic curves Ep1 and Ep2 produced by reducing the elliptic curve EQ modulo p1 and p2 are relatively prime, before the order of the elliptic curve is computed. If the elliptic curve is judged as not being secure, the elliptic curve is rejected without the order thereof being computed. As a result, unnecessary calculation of the order is avoided and the overall computational complexity in the elliptic curve construction device is reduced.

Here, the finitude judging unit may, given the primes p1=5 and p2=7 beforehand, compute the orders m1 and m2 of the respective elliptic curves Ep1 and Ep2 produced by reducing the elliptic curve EQ modulo p1=5 and p2=7.

With this construction, the finitude judging unit judges whether the orders m1 and m2 of the elliptic curve Ep1 and Ep2 after reducing the elliptic curve EQ modulo p1=5 and p2=7 are relatively prime. Performing the finitude judgement process in such a manner requires only the smallest computational complexity.

Here, the order computing unit may compute the order m of the elliptic curve E according to a Schoof-Elkies-Atkin algorithm and include an elliptic curve arithmetic operating unit for performing one of an addition and a doubling on the elliptic curve E: $y^2=f(x)$ on a residue class ring of polynomials in variables $\alpha$ and $\beta$, moduli of the residue class ring being polynomials $\beta^2-f(\alpha)$ and $h(\alpha)$, where $f(\alpha)=\alpha^3+a\alpha+b$ and $h(\alpha)$ is a polynomial in the variable $\alpha$, wherein the elliptic curve arithmetic operating unit includes the above elliptic curve arithmetic operation device.

With this construction, computational complexity for polynomial multiplications in the addition increases by 1×PMul and computational complexity for polynomial multiplications in the doubling decreases by 2×PMul, when compared with the prior art. Given that normally the doubling is more frequently repeated than the addition, the decrease in computational complexity of the doubling greatly contributes to a reduction in overall computational complexity in the elliptic curve construction device.

The fourth object can be fulfilled by an elliptic curve application device that uses elliptic curves, the elliptic curve application device including an elliptic curve constructing unit for determining parameters of an elliptic curve E which is defined over a finite field GF(p) and offers a high level of security, p being a prime, wherein the elliptic curve constructing unit includes the above elliptic curve construction device.

With this construction, the elliptic curve application device delivers the same effects as the above elliptic curve construction device. Such an elliptic curve application device can achieve highly secure, fast encryption or digital signature and so has great practical applicability.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 10 is a flowchart showing the procedure of performing addition or doubling on points on the elliptic curve by the elliptic curve order computing unit 504.

DESCRIPTION OF THE PREFERRED EMBODIMENT

The following is a description of an elliptic curve construction device 500 according to an embodiment of the invention.

1. Configuration of the Elliptic Curve Construction Device 500

The elliptic curve construction device 500, when given a prime p, outputs parameters of an elliptic curve that is defined over a finite field GF(p) and that has a prime order not equal to p. Such a constructed elliptic curve exhibits a high degree of security.

Figure 1:
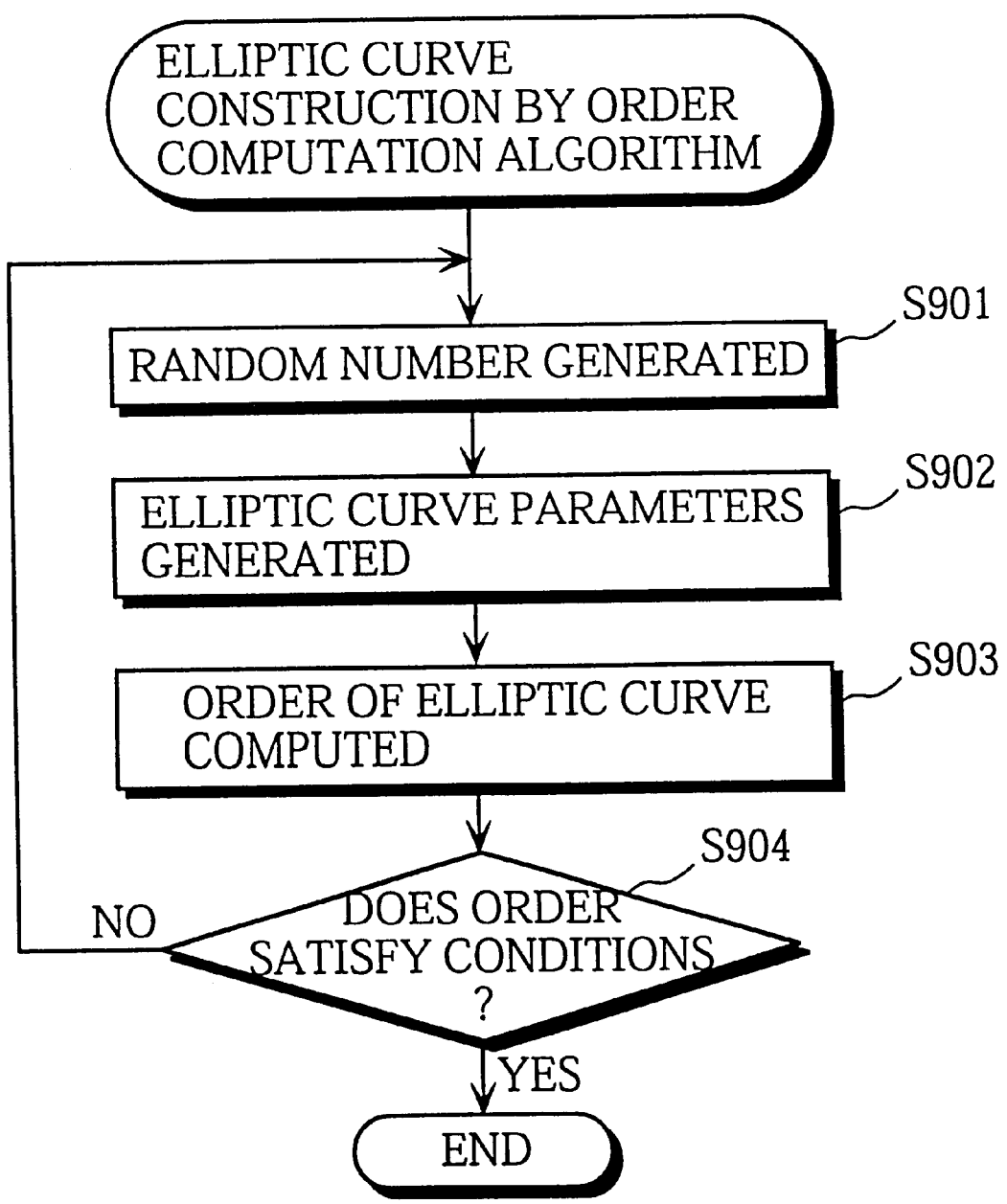
FIG. 1 is a flowchart showing a conventional elliptic curve construction method.
Figure 2:
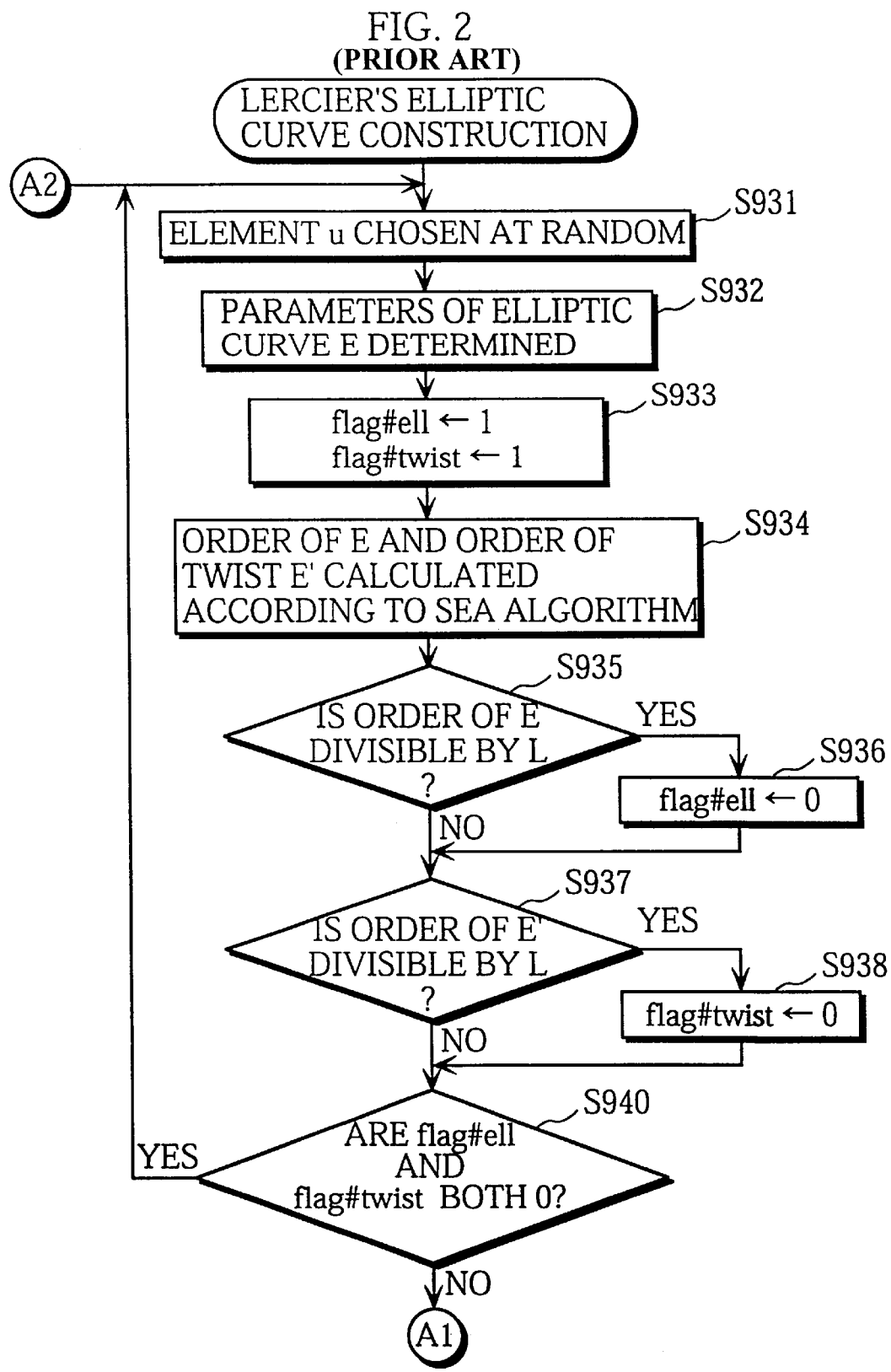
FIG. 2 is a flowchart showing Lercier's elliptic curve construction method as another prior art example.
Figure 3:
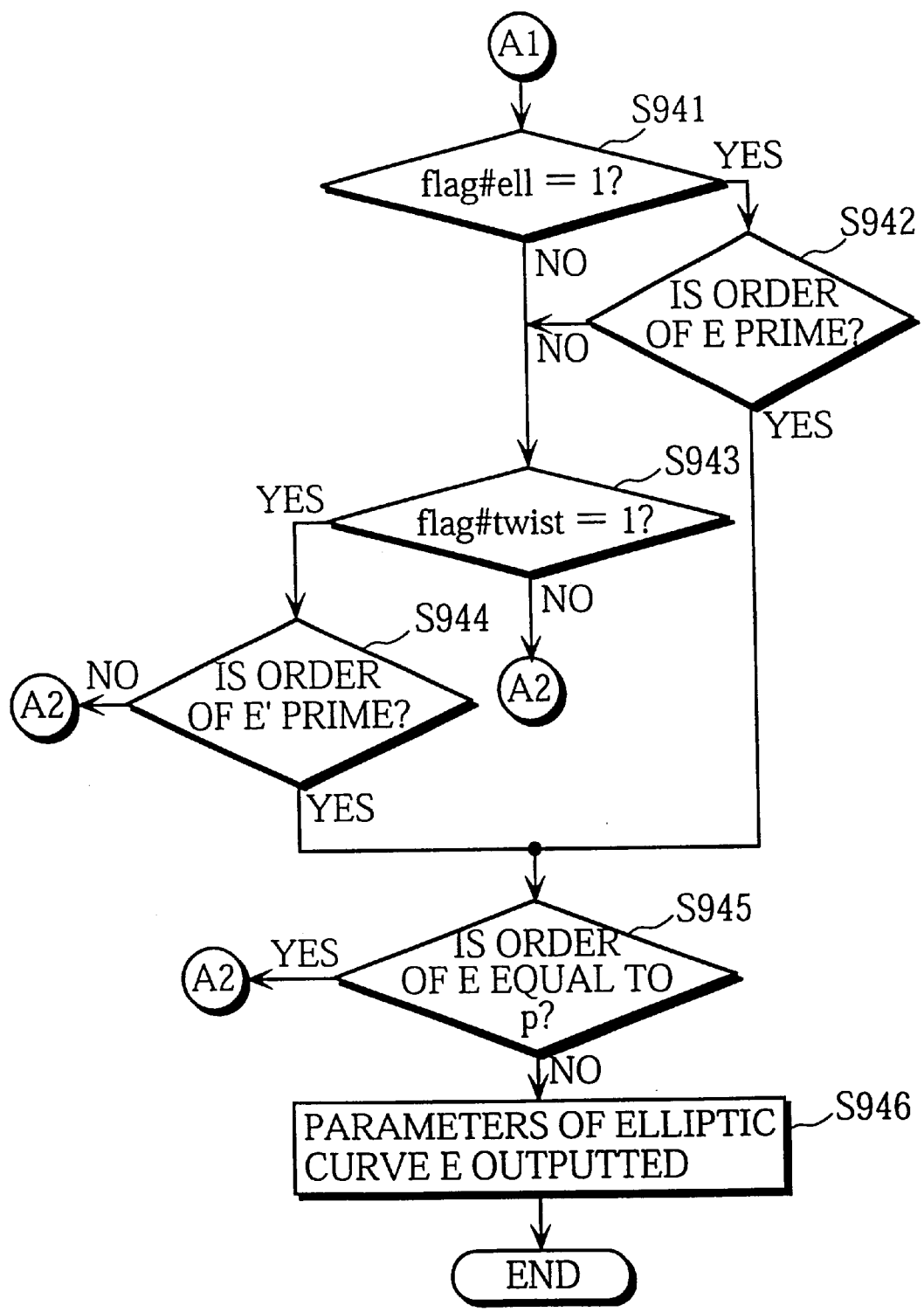
FIG. 3 is a flowchart that follows the flowchart of FIG. 2.
Figure 4:
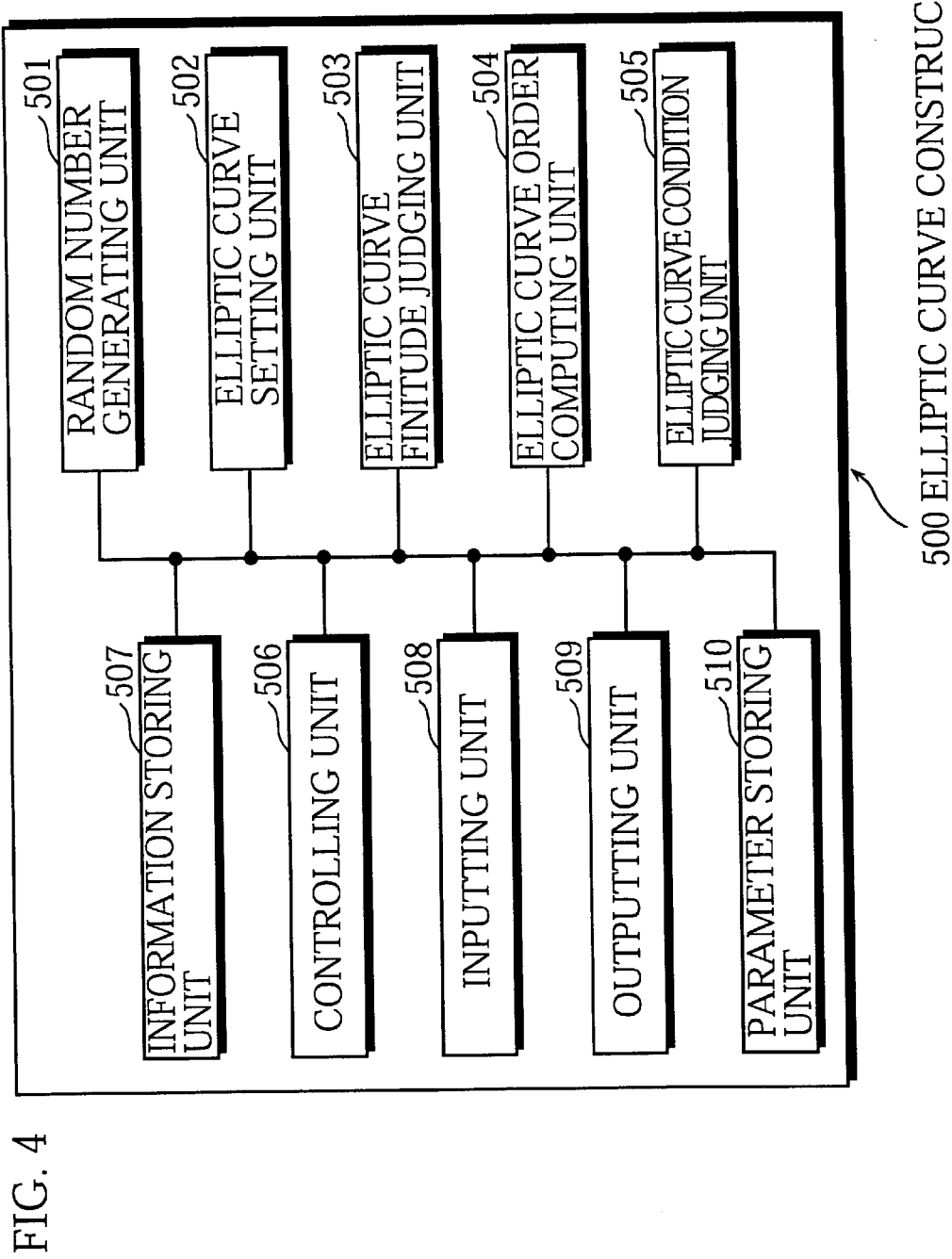
FIG. 4 is a block diagram showing the configuration of an elliptic curve construction device 500 according to an embodiment of the present invention.
Figure 5:
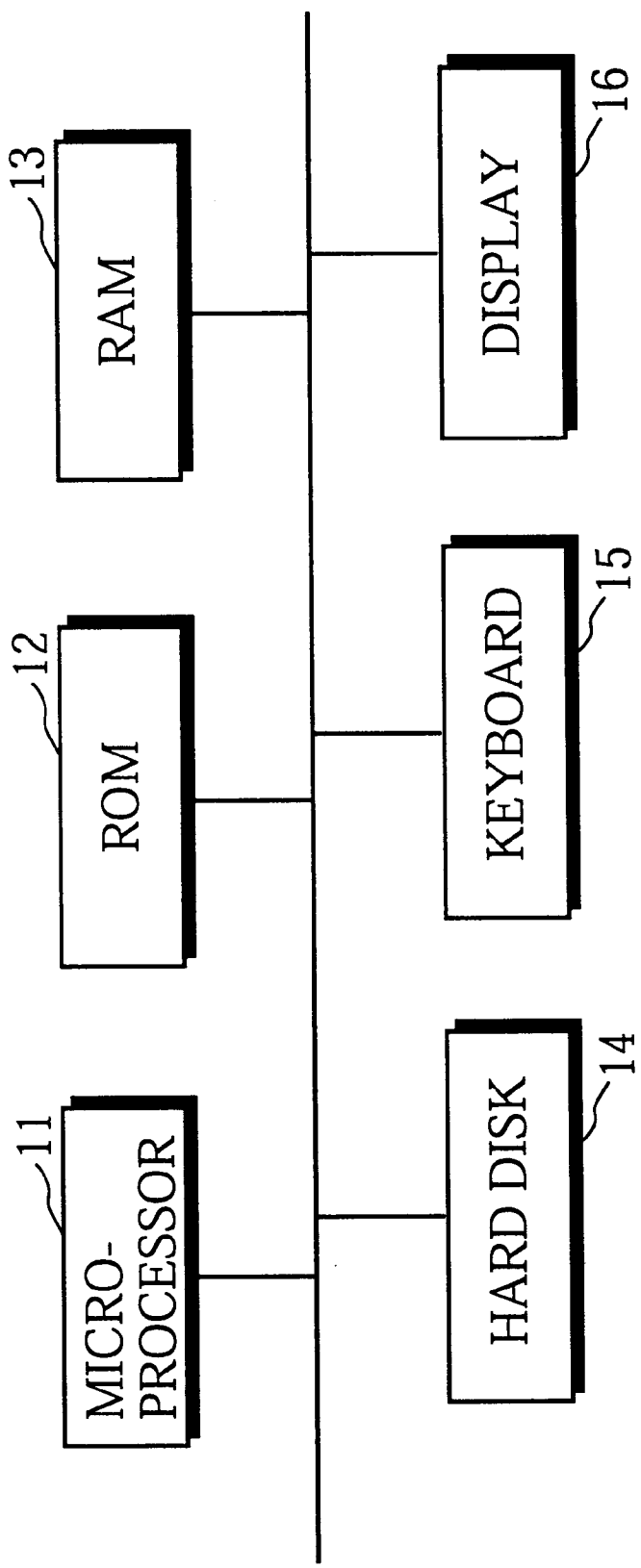
FIG. 5 is a block diagram showing the concrete configuration of the elliptic curve construction device 500.

The elliptic curve construction device 500 is roughly made up of a random number generating unit 501, an elliptic curve setting unit 502, an elliptic curve finitude judging unit 503, an elliptic curve order computing unit 504, an elliptic curve condition judging unit 505, a controlling unit 506, an information storing unit 507, an inputting unit 508, an outputting unit 509, and a parameter storing unit 510, as shown in FIG. 4. This elliptic curve construction device 500 is implemented by a microprocessor 11, a ROM (read only memory) 12, a RAM (random access memory) 13, a hard disk 14 storing a computer program, a keyboard 15, a display 16, and the like, as shown in FIG. 5. The functions of the random number generating unit 501, elliptic curve setting unit 502, elliptic curve finitude judging unit 503, elliptic curve order computing unit 504, elliptic curve condition judging unit 505, controlling unit 506, inputting unit 508, and outputting unit 509 are realized by way of executing the computer program in the hard disk 14 with the microprocessor 11.

1.1. Inputting unit 508

The inputting unit 508 is implemented by the keyboard 15 or the like. The inputting unit 508 receives from the user an instruction to construct an elliptic curve and an input of a prime p (p≠2). In this embodiment the prime p is 160 bits long.

The inputting unit 508 passes the received instruction and prime p to the controlling unit 506.

1.2. Information Storing Unit 507

Figure 6:
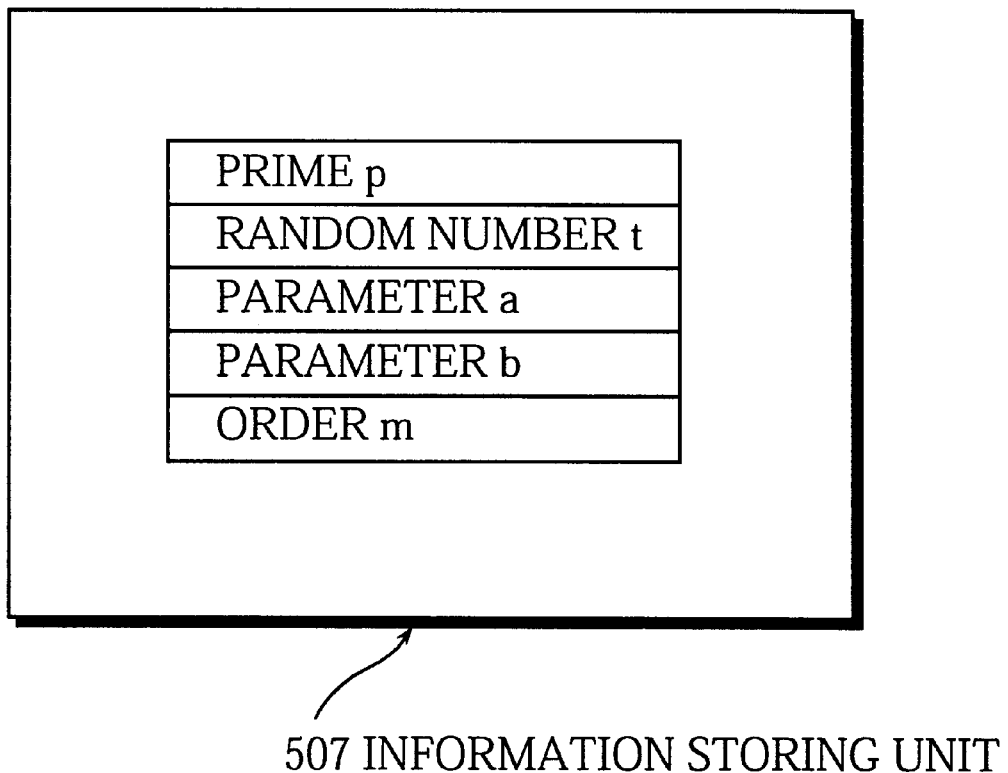
FIG. 6 shows an example of data stored in an information storing unit 507 in the elliptic curve construction device 500.

The information storing unit 507 is provided with areas for respectively storing the prime p, a random number t, a parameter a, a parameter b, and a order m, as shown in FIG. 6. Each of the areas has a 160-bit capacity. The information storing unit 507 is implemented by the RAM 13.

Among these, the parameters a and b are coefficients in an equation $y^2=x^3+ax+b$ that represents an elliptic curve E defined over the finite field GF(p).

1.3. Random Number Generating Unit 501

The random number generating unit 501 receives an instruction to generate a random number from the controlling unit 506.

On being instructed, the random number generating unit 501 generates the 160-bit random number t and writes the random number t into the information storing unit 507.

1.4. Elliptic Curve Setting Unit 502

(1) Function and Configuration of the Elliptic Curve Setting Unit 502

The elliptic curve setting unit 502 reads the random number t from the information storing unit 507. The elliptic curve setting unit 502 then sets the parameters a and b of the elliptic curve E: $y^2=x^3+ax+b$ such that $a=-3$ and $b=t$, thereby defining the elliptic curve E as $y^2=x^3-3x+t$.

The elliptic curve setting unit 502 writes the set parameters a and b into the information storing unit 507.

(2) Rationale for Defining the Elliptic Curve E as $y^2=x^3-3x+t$

The elliptic curve E: $y^2=x^3-3x+t$ bears a high probability of having a prime order, so that the elliptic curve E defined by the elliptic curve setting unit 502 is likely to be a secure elliptic curve.

The reason why the elliptic curve E: $y^2=x^3-3x+t$ bears a high probability of having a prime order is presented below.

For a curve E on a rational number field expressed by $$E:y^2=x^3+ax+b$$

(where a and b are integers)
a discriminant TD is defined as $$TD=4\times a^3+27\times b^2$$

This being so, when the discriminant TD is not 0, it means E is an elliptic curve. This is described in J. H. Silverman "The Arithmetic of Elliptic Curves" GTM106, Springer-Verlag (1986) (hereinafter referred to as "document 2"), p.50.

In the description that follows, it is assumed that the discriminant TD is not 0, i.e. E is an elliptic curve.

The following theorem is presented in p.221 in document 2.

[Theorem 1] When a point having a finite order exists on the elliptic curve E, its coordinates (x,y) are integers and the discriminant TD is divisible by $y^2$.

According to Theorem 1, when the discriminant TD is not divisible by $y^2$ at a point $P=(x,y)$ on the elliptic curve E, it implies that the point P does not have a finite order. That is to say, when the discriminant TD has no square factor and a point (x,y) with a finite order exists on the elliptic curve E, $y=1$ holds. Therefore, if there is no solution for $1=x^3+ax+b$ mod p, then there is no point with a finite order on the elliptic curve E. Theorem 1 leads to the following fact.

[Fact 1] When the probability of the discriminant TD having a square factor is low, the probability of the elliptic curve E containing a point with a finite order is low.

Let the parameters a and b of the elliptic curve E be elements of GF(p), the coordinates of some point on the elliptic curve E be elements of GF(p), and Ep be an elliptic curve obtained as a result. This process is called "reducing modulo p". Reducing the point $P=(x,y)$ with a finite order r on the elliptic curve E modulo p yields a point $Pp=(x \bmod p, y \bmod p)$ on the elliptic curve Ep. Such a point Pp has an order no less than r, without being transformed to the zero point 0 of the elliptic curve Ep.

Based on group theory, the following proposition is established.

[Proposition 1] If the order of the point Pp on the elliptic curve Ep is r, then the order of the elliptic curve Ep is divisible by r.

Let m be the order of the elliptic curve Ep and suppose there is a point of the finite order r on the elliptic curve E on the rational number field. When r is smaller than m, then m is divisible by r. Therefore, the order of Ep is not prime. Conversely, this leads to Fact 2.

[Fact 2] The elliptic curve Ep obtained by reducing modulo p the elliptic curve E which does not have a point of finite order on a rational number field bears a high probability of having a prime order.

Combining Fact 1 and Fact 2 yields the following fact.

[Fact 3] If the chance that the discriminant TD of the elliptic curve E has a square factor is small, then the chance that the elliptic curve Ep obtained by reducing E modulo p has a prime order is high.

In the following, elliptic curves $$E1:y^2=x^3+3ux+2u$$

$$E2:y^2=x^3-3x+t$$

(where $t>0$)
are tested with the discriminant TD. When the discriminants TD of E1 and E2 are respectively denoted by TD(E1) and TD(E2), $$TD(E1)=2^2\times3^3\times u^2\times(u+1)$$

$$TD(E2)=3^3\times(t^2-4)$$

As square factors of TD(E1), there are at least 2, 3, 6, u, and $2\times3\times u$. As square factors of TD(E2), the following proof shows that $t^2-4$ is not a square number.

[Proof] Let t be an integer not equal to 0. Since $t\neq0$, $t>1$. This is because $t^2-4=-3$ when $t=1$.

Here, suppose $t^2-4$ is a square number, i.e. $t^2-4=n^2$ for any positive integer $n>0$.

Then $(t-n)(t+n)=4$. The divisors of 4 are 1, 2, and 4, so that, given $t-n<t+n$, the combinations of $t-n$ and $t+n$ are $(t-n,t+n)=(1,4), (2,2), (4,1)$. In any of these combinations, t and n are not integers.

Thus, since $t^2-4$ is not a square number, the probability of TD(E2) having a square factor is low. Accordingly, TD(E2) is less likely to have a square factor than TD(E1). Let E1p and E2p be elliptic curves produced by respectively reducing the elliptic curves E1 and E2 modulo p. From Fact 3 it is clear that the elliptic curve E2p has a higher probability of having a prime order than the elliptic curve E1p.

It is thus apparent that the chance of the elliptic curve E2p having a prime order is high.

For the above reason, the elliptic curve setting unit 502 sets the parameters a and b in such a manner that the probability of the discriminant TD of the elliptic curve E having a square factor is lower than a predetermined threshold value.

Since the elliptic curve setting unit 502 is likely to choose a highly secure elliptic curve in advance in such a way, the elliptic curve construction device 500 does not have to repeat the processes of choosing an elliptic curve and testing its security over and over again, with it being possible to reduce the overall computational complexity required of the elliptic curve construction device 500.

1.5. Elliptic Curve Finitude Judging Unit 503

(1) Function and Configuration of the Elliptic Curve Finitude Judging Unit 503

The elliptic curve finitude judging unit 503 reads the parameters a and b of the elliptic curve E defined over the finite field GF(p), from the information storing unit 507.

The elliptic curve finitude judging unit 503 interprets the read parameters a and b as integers, and the elliptic curve E as an elliptic curve on a rational number field.

The elliptic curve finitude judging unit 503 chooses primes p1 and p2 that are smaller than the prime p, where $p1\neq p2$. Examples are $p1=5$ and $p2=7$. Next, the elliptic curve finitude judging unit 503 reduces the elliptic curve E on the rational number field respectively modulo p1 and p2 into the elliptic curves Ep1 and Ep2, and computes the orders m1 and m2 of the respective elliptic curves Ep1 and Ep2. When the elliptic curve E is given by the equation $y^2=x^3+ax+b$, then the orders m1 and m2 are computed as follows:

$$m1 = p + 1 + \sum_{n=0}^{p1-1} \left(\frac{n^3 + a \times n + b}{p1}\right) \quad \text{[Formula 1]}$$

$$m2 = p + 1 + \sum_{n=0}^{p2-1} \left(\frac{n^3 + a \times n + b}{p2}\right)$$

Here, (c/p) denotes the quadratic residue signal, wherein (c/p)=+1 if c is a quadratic residue modulo p, (c/p)=−1 if c is a quadratic nonresidue modulo p, and (c/p)=0 if c=0.

A brief explanation on Formula 1 is given below.

For a value n (0~p1−1), two points are present on the elliptic curve E when $n^3+a*n+b$ is a square number not equal to 0, one point is present on the elliptic curve E when $n^3+a*n+b=0$, and no point is present on the elliptic curve E when $n^3+a*n+b$ is not a square number. On the elliptic curve E: $y^2=x^3+ax+b$, the number of points whose x coordinate is n (0~p1−1) is expressed as $$1 + \left(\frac{n^3 + a \times n + b}{p1}\right) \quad \text{[Formula 2]}$$

Hence the total number of points on the elliptic curve E for p1 values from 0 to p1−1 can be written as $$1 + \sum_{n=0}^{p1-1} \left(1 + \left(\frac{n^3 + a \times n + b}{p1}\right)\right) = \quad \text{[Formula 3]}$$

$$1 + p + \sum_{n=0}^{p1-1} \left(\frac{n^3 + a \times n + b}{p1}\right)$$

thereby establishing order computation Formula 1. Note here that "1" appearing first in Formula 3 denotes the number of zero points 0.

This order computation algorithm is described in pp.219~220 in R., Schoof "Counting Points on Elliptic Curves over Finite Fields" *Jornal de Theorie des Nombres de Bordeaux* 7 (1995) (hereinafter referred to as "document 3").

Next, the elliptic curve finitude judging unit 503 checks whether the computed orders m1 and m2 are relatively prime, and provides the controlling unit 506 with order judgement information showing whether m1 and m2 are relatively prime.

It is to be noted that since p1 and p2 are small primes, computational complexity of calculating the orders due to the above order computation formula is within an acceptable range.

(2) Reason for Judging Whether the Orders m1 and m2 are Relatively Prime

The following theorem holds for the elliptic curve E over the rational number field. The theorem is given in p.176 in document 2.

[Theorem 3] Let Ep1 and Ep2 be elliptic curves obtained by reducing the elliptic curve E on the rational number field respectively modulo the primes p1 and p2 (where p1≠P2), and m1 and m2 be the orders of the respective elliptic curves Ep1 and Ep2. When m1 and m2 are relatively prime, then the elliptic curve E does not have a point whose order is finite.

Thus, when the order m1 of the elliptic curve Ep1 and the order m2 of the elliptic curve Ep2 are relatively prime, the elliptic curve E does not have a point with a finite order, so that according to Fact 2 there is a high probability that the order of the elliptic curve Ep is prime. In contrast, when m1 and m2 are not relatively prime, the elliptic curve E has a point with a finite order, so that according to Fact 2 the probability that the order of the elliptic curve Ep is prime is low. The level of security of such an elliptic curve E is not quite high. Accordingly, if the order m1 of the elliptic curve Ep1 and the order m2 of the elliptic curve Ep2 are not relatively prime, the elliptic curve finitude judging unit 503 rejects the elliptic curve E.

Thus, an elliptic curve which is not secure is rejected prior to the computation of the order of the elliptic curve. As a result, time needed for calculating the order of such an inappropriate elliptic curve by the elliptic curve order computing unit 504 can be saved, with it being possible to reduce the overall computational complexity in the elliptic curve construction device 500.

Note that though p1 and p2 can take any primes smaller than the prime p, it is preferable to set p1=5 and p2=7 as shown above. By such choosing the combination of smallest primes as p1 and p2, computational complexity of calculating the orders m1 and m2 becomes the smallest.

Here, if the prime p1 (or the prime p2) is 3, the elliptic curve discriminant TD modulo 3 becomes 0, meaning that Ep1 (or Ep2) is not an elliptic curve. Therefore, 3 should not be assigned to p1 (or p2).

1.6. Elliptic Curve Order Computing Unit 504

The elliptic curve order computing unit 504 calculates the order of the elliptic curve E on the finite field GF(p) in the following manner.

1.6.1. Calculation of the Order due to the SEA Algorithm

The elliptic curve order computing unit 504 employs the SEA algorithm to compute the order of the elliptic curve E.

Let m be the order of the elliptic curve E, and t be such that $m = p+1-t$

Also, the equation $f(x)=x^3+ax+b$ is given.

First, the elliptic curve order computing unit 504 sets an integer variable L at an initial value 2.

The elliptic curve order computing unit 504 then counts the number of linear factors when factoring a modular polynomial $\Phi L(T,j(E))$ in a ring GF(p)[T] of polynomials in a variable T.

When the number of linear factors is 2, the elliptic curve order computing unit 504 solves t mod L, and further solves t mod L^n according to the isogeny cycle algorithm.

When the number of linear factors is 1 or L+1, the elliptic curve order computing unit 504 solves t mod L, and checks whether the isogeny cycle algorithm is applicable. If the isogeny cycle algorithm is applicable, the elliptic curve order computing unit 504 solves t mod L^n (n=2, 3, . . . ) by the isogeny cycle algorithm.

When, on the other hand, the number of linear factors is 0, the elliptic curve order computing unit 504 narrows down possible values of t mod L from the set [0, 1, . . . , L−1].

Next, the elliptic curve order computing unit 504 increases L to the next prime if $L1^{\hat{}}(n1) \times L2^{\hat{}}(n2) \times \ldots \times Lk^{\hat{}}(nk) < 4 \times p^{\hat{}}(1/2)$ (where L1, L2, . . . , and Lk are primes and Lk=L)

and repeats the counting of the number of linear factors and the process which follows depending on the number of linear factors; until the above conditional expression is unmet.

If the conditional expression is unmet, the elliptic curve order computing unit 504 determines the order m according to the match & sort algorithm and writes the determined order m into the information storing unit 507.

This order computation algorithm is detailed in R. Lercier & F. Morain "Counting the Number of Points on Elliptic Curves over Finite Fields: Strategies Performances" *EUROCRYPT'95*, pp. 79~94, Springer-Verlag (1995).

Also, the match & sort algorithm is explained in detail in "Algorithmique des Courbes Elliptiques dans les Corps Finis" *Thesis*, Ecole Polytechnique-LIX (1997), pp.195~202 and "Elliptic Curves in Cryptography" *London Mathematical Society, Lecture Note Series* 265, Cambridge University Press (1999), pp.142~144.

1.6.2. Supplemental Remarks on the Order Computation by the SEA Algorithm

The computation of the elliptic curve order m by the SEA algorithm is elaborated below. The elliptic curve order computing unit 504 performs the following calculations.

Let $$E: y^2 = f(x)$$

be the elliptic curve over GF(p) where $f(x)=x^3+ax+b$.

(1) Characteristic Equation (1-1) Algebraic Closure K of GF(p)

K denotes the algebraic closure of GF(p). The algebraic closure K is a field containing GF(p). Any polynomial having coefficients of K can be decomposed into linear expressions.

Another example of the algebraic closure is a complex number field that is an algebraic closure of a real number field. Any polynomial having coefficients of a complex number field can be decomposed into linear expressions.

(1-2) Frobenius Map φp

For a point $P=(\alpha,\beta)$ (where $\alpha,\beta \in K$) on the elliptic curve E, the Frobenius map φp is defined as follows:

$$\phi p: (\alpha,\beta) \rightarrow (\alpha^p, \beta^p)$$

Since $(\alpha,\beta)$ is a point on E, $$\beta^2 = \alpha^3 + a\alpha + b$$

Raising both sides of this equation to the pth power yields $$\beta^{(2p)} = (\alpha^3 + a\alpha + b)^p$$

the right side of which can be developed to $$(\alpha^3 + a\alpha + b)^p = \alpha^{(3p)} + a^p * \alpha^p + b^p$$
$$= \alpha^{(3p)} + a * \alpha^p + b$$

in accordance with p.193 in Y. Morita Introduction to Algebra, Mathematics Selection 9, Shokabo (1987). Here, a and b are elements of GF(p), so that $a=a^p$ and $b=b^p$.

Hence $$(\beta^p)^2 = (\alpha^p)^3 + a(\alpha^p) + b$$

Therefore, $(\alpha^p, \beta^p)$ is a point on the elliptic curve E, too.

(1-3) Characteristic Polynomial

According to p.485 in R. Schoof "Elliptic Curves over Finite Fields and the Computation of Square Roots mod p" *Mathematics of Computation* vol.44, no.170 (1985) (hereinafter "document 4"), an equation $$(\phi p)^2(P) - t\phi p(P) + pP = 0$$

holds for a point $P=(\alpha,\beta)$ ($\alpha,\beta \in K$) on the elliptic curve E, where 0 is a zero element of the group of the elliptic curve E, t is the trace of the Frobenius map, and the signs + and − respectively denote addition and subtraction on the elliptic curve E.

The elliptic curve order m can be deduced from t by an equation $$m = p + 1 - t$$

in accordance with Hasse's theorem. That is to say, acquiring the trace t allows the order m of the elliptic curve E to be computed.

Suppose the point P is an L-division point on E (L a prime), i.e. P satisfies LP=0. Then an equation $$(\phi p)^2(P) - (t \bmod L)\phi p(P) + (p \bmod L)P = 0$$

holds.

The SEA algorithm computes t mod L from this equation. Here, when φp has an eigenvalue k, it means that $$\phi p(P) = kP$$

holds for the L-division point P on E, where kP is an exponentiation point of P.

This being so, the characteristic polynomial of φp is $$(k^2)P - (t \bmod L)kP + (p \bmod L)P = 0$$

Therefore, when the eigenvalue k exists, the characteristic polynomial of φp is assumed to be a quadratic equation in the variable k in the form $$k^2 - (t \bmod L)k + (p \bmod L) = 0$$

The SEA algorithm makes the following distinction depending on whether the quadratic equation has a root on GF(L).

(Case 1) when the quadratic equation has different roots k1 and k2

(Case 2) when the quadratic equation has a multiple root (Case 3) when the quadratic equation has no root The following procedures are carried out for Cases 1~3, respectively.

When the quadratic equation bears two different roots k1 and k2 (Case 1), $$k^2 - (t \bmod L)k + (p \bmod L) = (k-k1)(k-k2)$$

i.e.

$$k1 + k2 = t \bmod L$$

$$k1 * k2 = p \bmod L$$

Accordingly, if k1 is found, then t can be deduced from $$t = k1 + p/k1 = (k1^2 + p)/k1 \bmod L$$

When the quadratic equation bears a multiple root (Case 2), $$k1^2 = p \bmod L$$

Accordingly, k takes one of $\pm\sqrt{(p)} \bmod L$. The value of k can be specified by testing whether $$\phi p P = \pm(\sqrt{(p)} \bmod L)P$$

is true.

Depending on the eigenvalue of φp, t takes one of $\pm 2\sqrt{+(p)} \bmod L$.

When, on the other hand, the quadratic equation has no root (Case 3), the coordinates of $((\phi p)^2+(p \bmod L))P$ and the coordinates of $(t' \bmod L)\phi pP$ are compared, and t' that matches is set to be exact t mod L.

(1-4) Distinction

Since t mod L is unknown, generally it is impossible to determine which of Cases 1~3 applies.

However, this can be done by referencing the number of roots of a polynomial called a modular polynomial on GF(p).

When the number of roots of the modular polynomial $\Phi L(T,j(E))$ on GF(p) is 2, Case 1 applies. When the number of roots is 1 or L+1, Case 2 applies. When the number of roots is 0, Case 3 applies.

For more detail, see document 3, p.239.

(1-5) Solution of the Characteristic Equation in Case 3

In Case 3, the characteristic equation is solved in the following fashion.

$fL(\alpha)$ denotes an L-division polynomial that has, as roots, x coordinates of all L-division points P on E, i.e. P satisfying LP=0. Here, "P=$(\alpha,\beta)$ is an L-division point" is equivalent to "fL $(\alpha)$=0".

$fL(\alpha)$ is deduced through the use of recursive formulas. For more details, see document 4, p.485.

(1-6) Polynomial Representation of the Characteristic Equation

From the characteristic equation, $$(\phi p)^2(P)+(p \bmod L)P=(t \bmod L)\phi pP \quad \text{(equation 1)}$$

is found to be true. Let $(\alpha,\beta)$ be the coordinates of the point P. Since the point $P(\alpha,\beta)$ is a point on the elliptic curve E, it satisfies $$\beta^2-\alpha^3-a\alpha-b=0$$

Also, since $P(\alpha,\beta)$ is an L-division point, it satisfies $$fL(\alpha)=0$$

Let the coordinates of the point P in equation 1 be expressed on a residue class ring $$R=GF(p)[\alpha,\beta]/(\beta^2-\alpha 3-a\alpha-b,fL(\alpha))$$

of polynomials in variables $\alpha$ and $\beta$.

Computations on the polynomial residue class ring R are performed by substituting $\alpha^3+a\alpha+b$ for $\beta^2$ and 0 for fL $(\alpha)$.

In the following description, "in R" represents an operation in the polynomial residue class ring R.

According to equation 1

$$(\alpha^{\hat{}}(p^2),\beta^{\hat{}}(p^2))+(p \bmod L) (\alpha,\beta) =(t \bmod L) (\alpha^{\hat{}}p,\beta^{\hat{}}p)$$
$$\text{in } R \quad \text{(equation 2)}$$

holds.

(1-7) Solution of the Characteristic Equation in Case 1

In Case 1, the characteristic equation is solved in the following way.

k such that $\phi pP=kP$ is sought using a factor $h(\alpha)$ of the L-division polynomial $fL(\alpha)$. That is, $fL(\alpha)$ is divisible by $h(\alpha)$. The solution for $h(\alpha)$ is given in document 3, pp.242~253.

(1-8) Solution of the Characteristic Equation in Case 2

In Case 2, the characteristic equation is solved in the following way.

Since it is already known that $k=\pm\sqrt{p}$, the y coordinates are compared to specify the sign.

It is to be noted that since computational complexity in Case 3 is large as compared with Case 1 or Case 2, t mod L is not calculated in Case 3. Instead, the operation of narrowing down possible values of t mod L is conducted. By doing so, the computational complexity in Case 3 becomes roughly equal to computational complexity in Case 1 or Case 2.

As an exception, exact t mod L is computed for small L (such that $L \leq 5$), on the ground that the computational complexity in such a case is relatively small.

Obtaining possible values of t mod L is detailed in document 3, pp.239~241.

1.6.3. Calculation of t mod $L^{\hat{}}n$

The elliptic curve order computing unit 504 calculates t mod $L^{\hat{}}n$ as follows.

(1) Calculation of t mod L

The elliptic curve order computing unit 504 receives $h(\alpha)$ as an input, calculates t mod L as follows, and outputs t mod L.

Let the polynomial residue class ring R be defined as $$R=GF(p)[\alpha,\beta]/(\beta^2-\alpha^{\hat{}}3-a\alpha-b,h(\alpha))$$

To obtain t mod L, it is necessary to find k such that $$\phi p((\alpha,\beta))=k(\alpha,\beta) \text{ in } R$$

The elliptic curve order computing unit 504 assigns the values 0~(L−1)/2 to k' in sequence, computes the x coordinate of $\phi p((\alpha,\beta))$ in R and the x coordinate of k' $(\alpha,\beta)$ in R, and compares the x coordinate of $\phi p (\alpha,\beta))$ in R and the x coordinate of k' $(\alpha,\beta)$ in R. When the two x coordinates match for the first time, the elliptic curve order computing unit 504 computes the y coordinate of $\phi p((\alpha,\beta))$ in R and the y coordinate of k' $(\alpha,\beta)$ in R. If the y coordinate of $\phi p((\alpha,\beta))$ in R and the y coordinate of k' $(\alpha,\beta)$ in R match, the elliptic curve order computing unit 504 sets k=k' mod L, while if the two y coordinates do not match, the elliptic curve order computing unit 504 sets k=L−k' mod L.

The elliptic curve order computing unit 504 then determines $t=(k^{\hat{}}2+p)/k \bmod L$ and outputs t.

(2) Calculation of t mod $L^{\hat{}}n$ according to the Isogeny Cycle Algorithm

The elliptic curve order computing unit 504 finds t mod $L^{\hat{}}n$ using the isogeny cycle algorithm.

In Case 1, the elliptic curve order computing unit 504 first sets n=2, calculates a polynomial $H(\alpha)$ based on k mod L and $h(\alpha)$, and interprets $H(\alpha)$ as $h(\alpha)$. The elliptic curve order computing unit 504 then uses the polynomial $h(\alpha)$ to compute k mod $L^{\hat{}}n$, and decides based on the degree of the polynomial $h(\alpha)$ whether to proceed to the next step. When the degree of $h(\alpha)$ is denoted by $\deg(h(\alpha))$, then it is judged whether $$(\deg(h)^{\hat{}}2)*L^{\hat{}}2*(L^{\hat{}}(2*n))>(|p|)^{\hat{}}3/135$$

where $|p|$ represents the number of bits of p. If this inequality is true, the elliptic curve order computing unit 504 defines $$t=(k^{\hat{}}2+p)/k \bmod L^{\hat{}}n$$

and completes the isogeny cycle. If the inequality is false, the elliptic curve order computing unit 504 adds 1 to n and repeats the above procedure until the inequality is satisfied. As a result, t mod $L^{\hat{}}n$ is obtained.

Although the same computation as in Case 1 is performed in Case 2, in Case 2 the isogeny cycle algorithm might not be applicable. Accordingly, the elliptic curve order computing unit 504 tests whether the isogeny cycle algorithm is applicable before computing t mod $L^{\hat{}}n$.

On the other hand, k mod L^n (where n>1) is computed as follows.

Suppose k_i=k mod L^i (1≤t≤n). The elliptic curve order computing unit 504 receives k mod L^(n−1) and h(α) as inputs and calculates k mod L^n in the following way.

Let the polynomial residue class ring R be defined as $$R=GF(p) [\alpha,\beta]/(\beta^2-\alpha^3-a\alpha-b,h(\alpha))$$

To obtain k mod L^n, it is necessary to find k such that $$\phi p(\alpha,\beta))=(k\_(n-1)+L^{(n-1)}*K) (\alpha,\beta) \text{ in } R$$

Assigning the values 0~(L−1)/2 to K' in sequence, the elliptic curve order computing unit 504 calculates the x coordinate of φp((α,β)) in R and the x coordinate of (k_(n−1) +L^(n−1) *K') (α,β) in R, and compares the x coordinate of φp((α,β)) in R and the x coordinate of (k_(n−1)+ L^(n−1) *K') (α,β) in R. When the x coordinates match for the first time, the elliptic curve order computing unit 504 defines $$k\_n=k\_(n-1)+L^{(n-1)}*K' \mod L^n$$

and sets k_n as k mod L^n.

The above described processing is detailed in J. M. Couveignes, L. Dewaghe, and F. Morain "Isogeny Cycles and the Schoof-Elkies-Atkin Algorithm" LIX/RR/96/03 (1996).

1.6.4. Judgement on the Elliptic Curve E by the Elliptic Curve Order Computing Unit 504

As mentioned above, when ΠLk^(nk) exceeds 4√p, the elliptic curve order computing unit 504 judges that the computation by the SEA algorithm has been completed, determines the elliptic curve order m, and ends the processing thereof.

Here, to shorten computation time, the elliptic curve order computing unit 504 tests the elliptic curve E and rejects such E that is to be judged as not being secure by the elliptic curve condition judging unit 505, thereby halting the order computation in progress.

More specifically, once t mod L has been determined, the elliptic curve order computing unit 504 calculates p+1−t mod L and checks whether p+1−t mod L is 0. If p+1−t mod L is 0, it signifies the order of the elliptic curve E cannot be prime. Accordingly, the elliptic curve order computing unit 504 outputs elliptic curve rejection information to the controlling unit 506 to reject the elliptic curve E, and discontinues the order computation.

By such rejecting an elliptic curve which is not secure once t mod L has been determined, the elliptic curve order computing unit 504 can avoid needless computations.

For this processing, see document 1.

1.6.5. Elliptic Curve Exponentiation

As described once, elliptic curve exponentiation needs to be performed to gain the eigenvalue of φp. Algorithms of computing elliptic curve exponentiation points are presented below.

(1) Method using a Division Polynomial

The elliptic curve order computing unit 504 obtains an exponentiation point in the above computation of t mod L, in the following way.

When using the division polynomial f_n, $$n(\alpha,\beta)=(\alpha-f\_(n-1) (\alpha)^*f\_(n+1) (\alpha)/(f\_n(\alpha)^2*f(\alpha)), \beta(f\_(n+2) (\alpha)^*f\_(n-1) (\alpha)^\wedge$$

$$2-f\_(n-2)(\alpha)^*f\_(n+1) (\alpha)^2)/(4^*f\_n$$

$$(\alpha)^3))$$

if n is even, or $$n(\alpha,\beta)=(\alpha-f\_(n-1) (\alpha)^*f\_(n+1) (\alpha)^*$$

$$f(\alpha)/f\_n(\alpha)^2,$$

$$\beta(f\_(n+2) (\alpha)^*f\_(n-1) (\alpha)^2-f\_(n-2)$$

$$(\alpha)^*$$

$$f\_(n+1) (\alpha)^2)/(4^*\beta^*f(\alpha)^*f\_n(\alpha)^3))$$

if n is odd.

This is described in detail in document 4, pp.485~486.

(2) Method using the Elliptic Curve Arithmetic Operation over the Polynomial Residue Class Ring R The elliptic curve order computing unit 504 finds an exponentiation point in the computation of t mod L^n, as follows.

The use of the above division polynomial in computing t mod L^n causes inefficiency, since it requires calculation of such an unnecessary division polynomial f_(L^(n−2)) from f_1. Accordingly, the elliptic curve order computing unit 504 computes exponentiation points by elliptic curve arithmetic operations described below.

Consider an elliptic curve arithmetic operation over a finite field. When a 2-tuple coordinate is used, it is necessary to perform divisions. However, a division over a finite field normally requires an average of 10 times as much computational complexity as a multiplication over the finite field, so that a 3-tuple coordinate which does not require divisions is adopted instead. The same applies for elliptic curve arithmetic operations over a polynomial residue class ring.

In the following, the first and second components of the 2-tuple coordinate are respectively called x coordinate and y coordinate, whereas the first, second, and third components of the 3-tuple coordinate are respectively called X coordinate, Y coordinate, and Z coordinate.

Here, Jacobian coordinate over a finite field is employed. Since computation is easier if the input and the output are of the same form, the coordinates of a point on an elliptic curve over the polynomial residue class ring R are expressed as $$(X (\alpha):\beta^*Y(\alpha):Z(\alpha))$$

which represents the form of the input and the output.

Then, this form of the input and the output is altered in the Jacobian coordinate through transformation $$(X' (\alpha):\beta^*Y' (\alpha):Z' (\alpha)) \rightarrow (\beta^2*X' (\alpha):\beta^4* Y' (\alpha):\beta^*Z' (\alpha))$$

Here, β^2=f (α). Therefore, provided that $$X(\alpha)=f(\alpha)^*X' (\alpha)$$

$$Y(\alpha)=f(\alpha)^2*Y' (\alpha)$$

$$Z(\alpha)=Z' (\alpha)$$

then the transformed point takes the form $$(X(\alpha):Y(\alpha):62 *Z(\alpha))$$

(2-1) Projection of Elliptic Curve Points

The elliptic curve order computing unit 504 transforms the affine coordinates (φ(α),β×Φ(α) of a point on the elliptic curve E using polynomials $$X(\alpha)=f(\alpha)\times\phi(\alpha)$$

$$Y(\alpha)=f(\alpha)^2\times\Phi(\alpha)$$

$$Z(\alpha)=1$$

to generate the projective coordinates $(X(\alpha):Y(\alpha):\beta \times Z(\alpha))$, where $\phi(\alpha)$ and $\Phi(\alpha)$ are polynomials.

(2-2) Addition and Doubling on the Elliptic Curve E

For points on the elliptic curve E defined over the polynomial residue class ring R, an elliptic curve arithmetic operation is performed as follows.

Elliptic curve exponentiation can be split into additions and doublings. As an example, for a point P on the elliptic curve E, calculating 100×P is achieved through 6 doublings and 2 additions of points on E, as can be seen from $$100 \times P = 2(2(P+2(2(P+2P))))$$

Splitting elliptic curve exponentiation into doublings and additions is done by a signed binary window method which is described in pp. 345~35.7 in K. Koyama & Y. Tsuruoka "Speeding up Elliptic Cryptosystems by Using a Signed Binary Window Method" *Advances in Cryptology—CRYPTO '92*, Lecture Notes in Computer Science vol. 740, Springer-Verlag (1993).

For the input of the coordinates of at least one point on the elliptic curve $$E: y^2 = f(x)$$

on the residue class ring R of polynomials in variables $\alpha$ and $\beta$ with one or more elements of the finite field GF(p) as coefficients, the moduli of the ring R being polynomials $\beta^2 - f(\alpha)$ and $h(\alpha)$, the elliptic curve order computing unit 504 performs an elliptic curve arithmetic operation to compute the coordinates of a point on the elliptic curve E.

(2-2-1) Addition

Elliptic curve addition is carried out as follows.
For the input of points P and Q $(P \neq \pm Q)$ $$P = (X1(\alpha):Y1(\alpha):\beta \times Z1(\alpha))$$

$$Q = (X2(\alpha):Y2(\alpha):\beta \times Z2(\alpha))$$

on the elliptic curve E, the elliptic curve order computing unit 504 calculates $$U1 = X1 \times Z2^2 = X1 * Z2 * Z2$$

$$U2 = X2 \times Z1^2 = X2 * Z1 * Z1$$

$$S1 = Y1 \times Z2^3 = Y1 * Z2 * (Z2^2)$$

$$S2 = Y2 \times Z1^3 = Y2 * Z1 * (Z1^2)$$

$$H = U2 - U1$$

$$r = S2 - S1$$

and calculates $$X3 = -H^3 - 2 \times U1 \times H^2 + r^2$$
$$= -(H*H)*H - 2 \times U1 * H^2 + r*r$$

$$Y3 = -S1 \times H^3 + r \times (U1 \times H^2 - X3)$$
$$= -S1 * H^3 + r*(U1 \times H^2 - X3)$$

$$Z3 = Z1 * Z2 * H$$

The elliptic curve order computing unit 504 then computes $$\beta \times Z3$$

and thereby obtains $$P+Q = (X3(\alpha):Y3(\alpha):\beta \times Z3(\alpha))$$

as the outcome of adding the points P and Q on the elliptic curve E.

Note here that, though X1, Y1, Z1, X2, Y2, Z2, X3, Y3, Z3, U1, U2, S1, S2, H, and r are polynomials in the variable $\alpha$ and therefore should be written like X1$(\alpha)$, Y1$(\alpha)$, and Z1$(\alpha)$ to be precise, $(\alpha)$ has been omitted for convenience in writing.

2-2-2 Doubling

Elliptic curve doubling is carried out as follows. For the input of the point P $$P = (X1(\alpha):Y1(\alpha):\beta \times Z1(\alpha))$$

on the elliptic curve E, the elliptic curve order computing unit 504 calculates $$S = 4 \times X1 \times Y1^2 = 4 \times X1 * Y1 * Y1$$

$$M = 3 \times X1^2 + a \times Z1^4 \times f(\alpha)^2$$
$$= 3 \times X1 * X1 + a * ((Z1*Z1)*f(\alpha))*(Z1^2 \times f(\alpha))$$

$$T = -2 \times S + M * M$$

and calculates $$X3 = T$$

$$Y3 = -8 \times Y1^4 + M \times (S - T)$$
$$= -8 \times (Y1^2)*(Y1^2) + M*(S - T)$$

$$Z3 = 2 \times Y1 * Z1$$

The elliptic curve order computing unit 504 then computes $$\beta \times Z3$$

and so obtains $$2P = (X3(\alpha):Y3(\alpha):\beta \times Z3(\alpha))$$

as the outcome of doubling the point P on the elliptic curve E.

Note once again that, though X1, Y1, Z1, X3, Y3, Z3, S, M, and T are polynomials in the variable a and therefore should be written like X1$(\alpha)$, Y1$(\alpha)$, and Z1$(\alpha)$ to be precise, $(\alpha)$ has been omitted for convenience in writing.

The numbers of multiplications performed in the above addition formula and doubling formula are respectively 16 and 10, as can be seen from the number of operators * in each of the formulas. When computational complexity of a polynomial multiplication is measured as 1×PMul, computational complexity of the addition is 16×PMul and computational complexity of the doubling is 10×PMul.

When compared with prior art example 3, the computational complexity of the addition is 1×PMul larger than that of the addition in example 3, whereas the computational complexity of the doubling is 2×PMul smaller than that of the doubling in example 3.

In general, doubling is more frequently repeated than addition, so that the decrease in computational complexity of the doubling greatly benefits a reduction in overall computational complexity.

(2-3) Deduction of the Addition Formula and the Doubling Formula

The following is an explanation on how the above addition formula and doubling formula are deduced.

Addition and doubling for the elliptic curve E over a finite field in the Jacobian coordinate are as follows. Here, P=(x1:y1:z1), Q=(x2:y2:z2), and P+Q=R=(x3:y3:z3).

(Addition) (where $P \neq \pm Q$)

$$x3 = -H^3 - 2*U1*H^2 + r^2$$

$$y3 = -S1*H^3 + r*(U1*H^2 - x3)$$

$$z3 = z1*z2*H$$

where $$U1 = x1*z2^2$$

$$U2 = x2*z1^2$$

$$S1 = y1*z2^3$$

$$S2 = y2*z1^3$$

$$H = U2 - U1$$

$$r = S2 - S1$$

(Doubling) (where $P = Q$)

$$x3 = T$$

$$y3 = -8*y1^4 + M*(S - T)$$

$$z3 = 2*y1*z1$$

where $$S = 4*x1*y1^2$$

$$M = 3*x1^2 + a*z1^4$$

$$T = -2*S + M^2$$

These addition and doubling are then applied onto the polynomial residue class ring R.

Here, $P = (X1(\alpha):Y1(\alpha):\beta*Z1(\alpha))$, $Q = (X2(\alpha):Y2(\alpha):\beta*Z2(\alpha))$, and $P+Q = R = (X3(\alpha):Y3(\alpha):\beta*Z3(\alpha))$.

Also, $$x1 = X1(\alpha),\ y1 = Y1(\alpha),\ z1 = \beta*Z1(\alpha)$$

$$x2 = X2(\alpha),\ y2 = Y2(\alpha),\ z2 = \beta*Z2(\alpha)$$

$$x3 = X3(\alpha),\ y3 = Y3(\alpha),\ z3 = \beta*Z3(\alpha)$$

are given.

(Addition for the Elliptic Curve E on the Polynomial Residue Class Ring R in Jacobian Coordinate)

Addition for the elliptic curve E on the polynomial residue class ring R in the Jacobian coordinate is the following:

$$U1 = X1*\beta^2*Z2^2$$

$$U2 = X2*\beta^2*Z1^2$$

$$S1 = Y1*\beta^3*Z2^3$$

$$S2 = Y2*\beta^3*Z1^3$$

Let $U1' = U1/\beta^2$, $U2' = U2/\beta^2$, $S1' = S1/\beta^3$, and $S2' = S2/\beta^3$.
Then $$H = (U2' - U1')*\beta^2$$

$$r = (S2' - S1')*\beta^3$$

Here, let $H' = H/\beta^2$ and $r' = r/\beta^3$. Then $$x3 = -H'^3*\beta^6 - 2*U1'*\beta^2*H'^2*\beta^4 + r'^2*(\beta^3)^2$$

Here, let $x3' = x3/\beta^6$. Then $$x3' = -H'^3 - 2*U1'*H'^2 + r'^2$$

$$y3 = -S1'*\beta^3*H'^3*\beta^6 + r'*\beta^3*(U1'*\beta^2*H'^2*\beta^4 - x3'*\beta^6)$$

Here, let $y3' = y3/\beta^9$. Then $$y3' = -S1'*H'^3 + r'*(U1'*H'^2 - x3')$$

$$z3 = Z1*\beta*Z2*\beta*H'*\beta^2$$

Here, let $z3' = z3/\beta^4$. Then $$X3 = x3'*\beta^6$$

$$Y3 = y3'*\beta^9$$

$$\beta*Z3 = z3'*\beta^4$$

Accordingly, $$(X3:Y3:\beta*Z3) = (X3/\beta^6:Y3/\beta^9:\beta*Z3/\beta^4)$$

so that $$(X3:Y3:\beta*Z3) = (X3':y3':\beta*z3')$$

This being so, setting x3', y3', z3', U1', U2', S1', S2', H', and r' respectively as X3, Y3, Z3, U1, U2, S1, S2, H, and r yields the addition formula of the invention.

Doubling for the Elliptic Curve E on the Polynomial Residue Class Ring R in Jacobian Coordinate Doubling for the elliptic curve E on the polynomial residue class ring R in the Jacobian coordinate is the following:

$$S = 4*X1*Y1^2$$

$$M = 3*X1^2 + a*Z1^4*\beta^4$$

Since $\beta^2 = f(\alpha)$, $$M = 3*X1^2 + a*Z1^4*f(\alpha)^2$$

and $$x3 = T$$

$$y3 = -8*Y1^4 + M*(S - T)$$

$$z3 = 2*Y1*Z1*\beta$$

From $X3 = x3$, $Y3 = y3$, and $Z3 = z3/\beta = 2*Y1*Z1$, the doubling formula of the invention is deduced.

1.7. Elliptic Curve Condition Judging Unit 505

The elliptic curve condition judging unit 505 reads the prime p and the order m from the information storing unit 507 and judges whether the order m is a prime and whether m≠p. The elliptic curve condition judging unit 505 then outputs security judgement information showing whether m is a prime not equal to p, to the controlling unit 506.

1.8. Controlling Unit 506

The controlling unit 506 receives the prime p and the instruction to construct an elliptic curve, from the inputting unit 508.

On receiving the instruction, the controlling unit 506 writes the prime p into the information storing unit 507 and instructs the random number generating unit 501 to generate a random number.

The controlling unit 506 then controls the random number generating unit 501, the elliptic curve setting unit 502, the elliptic curve finitude judging unit 503, the elliptic curve order computing unit 504, and the elliptic curve condition judging unit 505 to sequentially execute their respective procedures.

Also, the controlling unit 506 receives the order judgement information from the elliptic curve finitude judging unit 503. If the received information shows that the order m1 and the order m2 are relatively prime, the controlling unit 506 has the elliptic curve order computing unit 504 commence the processing thereof. If the information shows that m1 and m2 are not relatively prime, the controlling unit 506 cancels the processing of the elliptic curve order computing unit 504 and instead instructs the random number generating unit 501 to generate a random number.

Also, when receiving the elliptic curve rejection information from the elliptic curve order computing unit 504, the controlling unit 506 cancels the processing of the elliptic curve condition judging unit 505 and instead instructs the random number generating unit 501 to generate a random number.

Also, the controlling unit 506 receives the security judgement information from the elliptic curve condition judging unit 505. If the received information shows that the order m is a prime not equal to the prime p, the controlling unit 506 reads the parameters a and b from the information storing unit 507 and passes the read parameters a and b to the outputting unit 509. If the read information does not show that m is a prime not equal to p, the controlling unit 506 controls the random number generating unit 501 to generate a random number.

1.9. Outputting Unit 509

The outputting unit 509 receives the parameters a and b from the controlling unit 506 and writes the parameters a and b into the parameter storing unit 510.

1.10. Parameter Storing Unit 510

The parameter storing unit 510 is implemented by the hard disk 14 and stores the parameters a and b.

2. Operation of the Elliptic Curve Construction Device 500

The following is an explanation of the operation of the elliptic curve construction device 500.

2.1. General Operation of the Elliptic Curve Construction Device 500)

Figure 7:
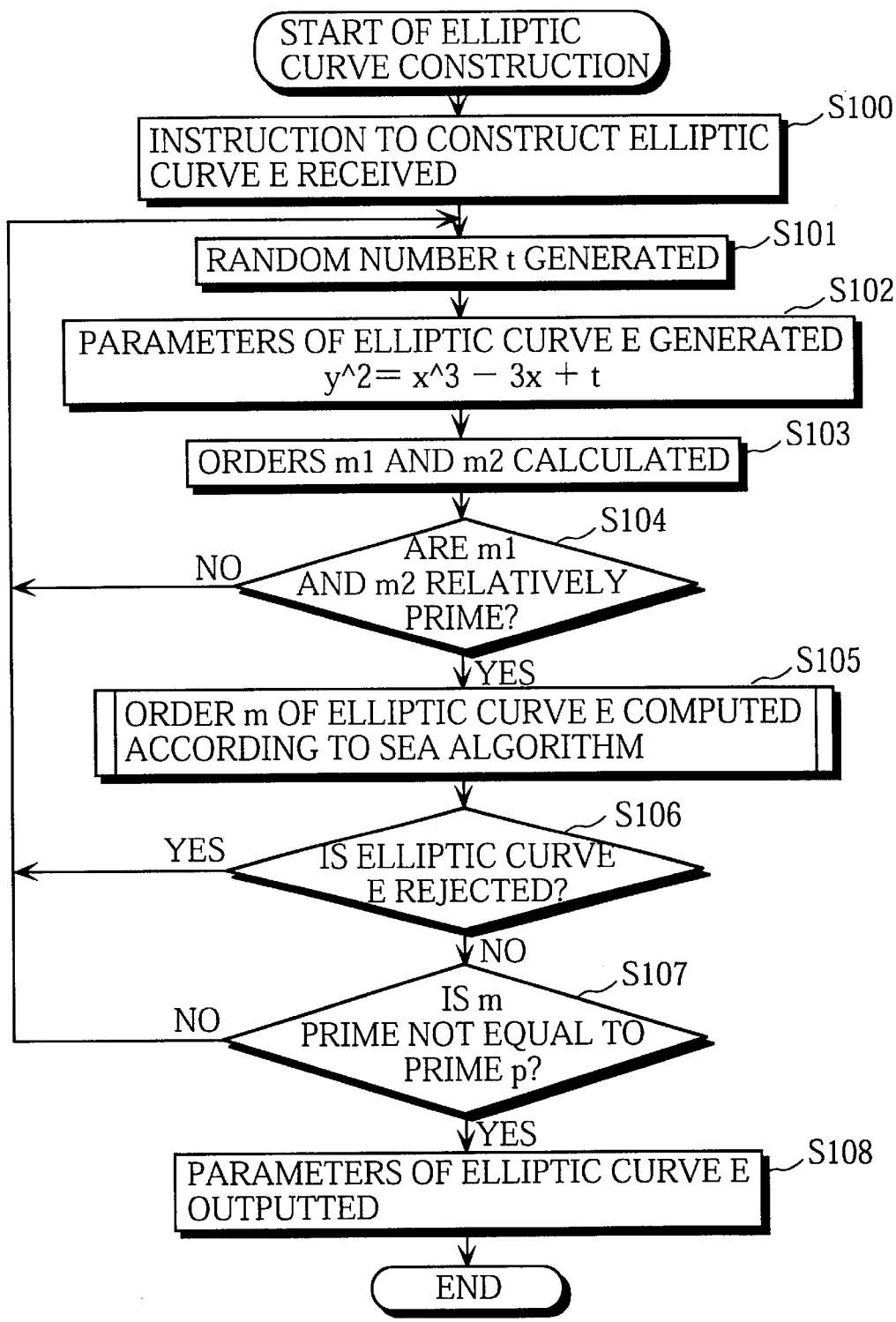
FIG. 7 is a flowchart showing the procedure of constructing an elliptic curve by the elliptic curve construction device 500.

The general operation of the elliptic curve construction device 500 is explained below with reference to FIG. 7.

The inputting unit 508 receives from the user a prime p and an instruction to construct an elliptic curve E, and passes the prime p and the instruction to the controlling unit 506 (S100).

The controlling unit 506 instructs the random number generating unit 501 to generate a random number, and the random number generating unit 501 accordingly generates a random number t and writes the random number t into the information storing unit 507 (S101).

The elliptic curve setting unit 502 reads the random number t from the information storing unit 507 and sets $-3$ and t respectively as parameters a and b of the elliptic curve E (S102).

The elliptic curve finitude judging unit 503 chooses primes p1 and p2, calculates the orders m1 and m2 of respective elliptic curves Ep1 and Ep2 produced by reducing the elliptic curve E on a rational number field modulo p1 and p2 (S103), and checks whether m1 and m2 are relatively prime (S104). If m1 and m2 are not relatively prime, the operation returns to step S101 under the control of the controlling unit 506.

If m1 and m2 are relatively prime, the controlling unit 506 instructs the elliptic curve order computing unit 504 to compute the order m of the elliptic curve E, and the elliptic curve order computing unit 504 accordingly computes the order m using the SEA algorithm (S105).

If the controlling unit. 506 receives elliptic curve rejection information (S106), the operation returns to step S101.

If the controlling unit 506 does not receive the elliptic curve rejection information, the elliptic curve condition judging unit 505 judges whether the order m of the elliptic curve E is a prime not equal to the prime p (S107). When m is a prime and m≠p, the controlling unit 506 instructs the outputting unit 509 to output the parameters a and b, and the outputting unit 509 accordingly outputs the parameters a and b (S108).

When it is not judged in step S107 that the order m is a prime not equal to p, the operation returns to step S101., 2.2. Operation of the Elliptic Curve Order Computing Unit 504

Figure 8:
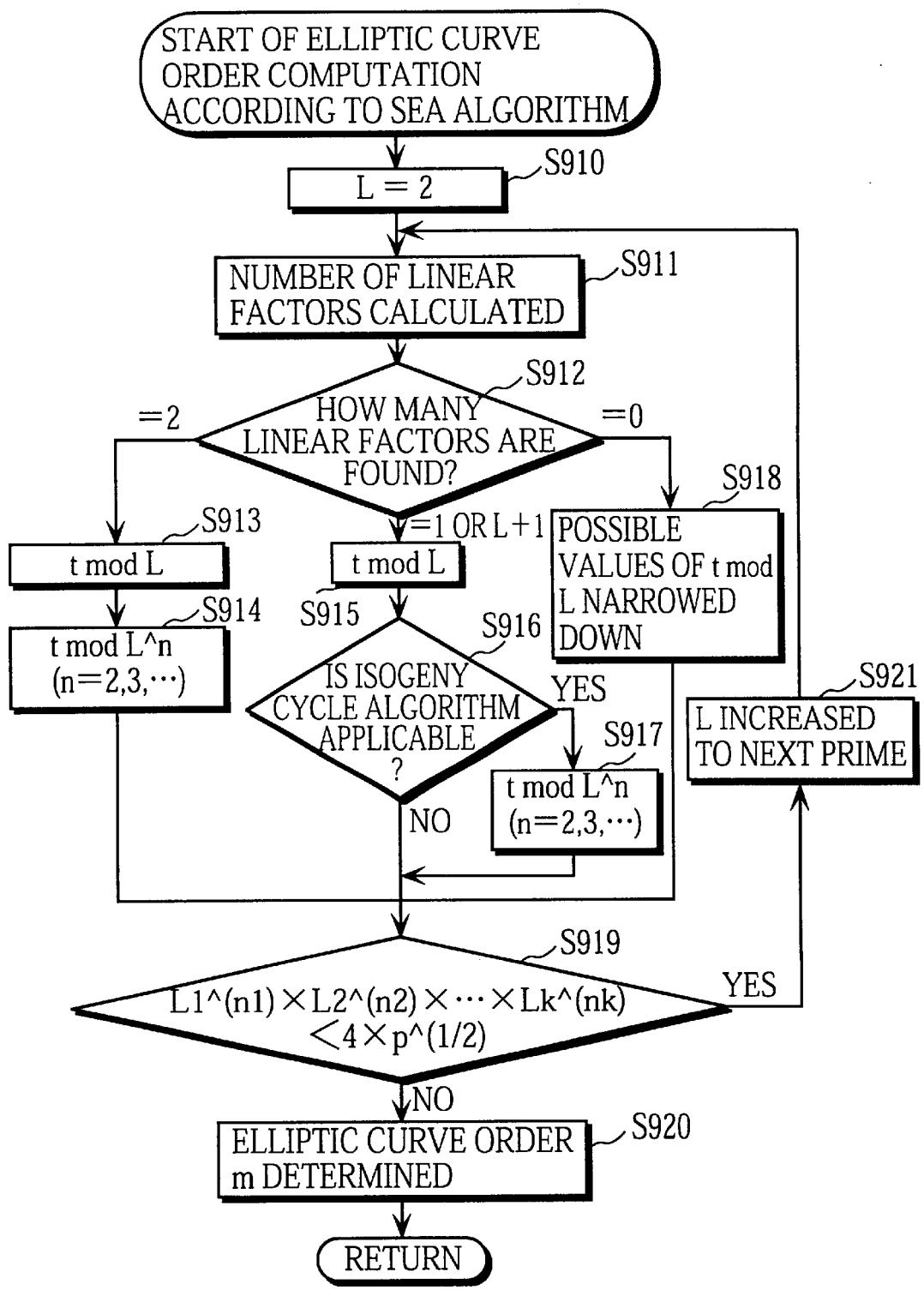
FIG. 8 is a flowchart showing the procedure of computing the order of the elliptic curve by an elliptic curve order computing unit 504 in the elliptic curve construction device 500.

The operation of the elliptic curve order computing unit 504 is explained below with reference to FIG. 8.

Let m be the order of the elliptic curve E and t be such that $$m = p + 1 - t$$

Also, let $$f(x) = x^3 + ax + b$$

The elliptic curve order computing unit 504 sets an integer variable L at an initial value 2 (S910).

The elliptic curve order computing unit 504 then calculates the number of linear factors after factoring a modular polynomial $\Phi L(T, j(E))$ in a ring $GF(p)[T]$ of polynomials in a variable T (S911).

When the number of linear factors is 2 (S912), the elliptic curve order computing unit 504 solves t mod L (S913) and solves t mod $L^n$ (n=2, 3, ... ) according to the isogeny cycle algorithm (S914).

When the number of linear factors is 1 or L+1 (S912), the elliptic curve order computing unit 504 solves t mod L (S915) and judges whether the isogeny cycle algorithm is applicable (S916). If the isogeny cycle algorithm is applicable, the elliptic curve order computing unit 504 computes t mod $L^n$ (n=2, 3, ... ) according to the isogeny cycle algorithm (S917).

When the number of linear factors is 0 (S912), on the other hand, the elliptic curve order computing unit 504 narrows down possible values of t mod L from the set [0, 1, ... L−1] (S918).

Next, if $$L1^{(n1)} \times L2^{(n2)} \times \ldots \times Lk^{(nk)} < 4 \times p^{(1/2)}$$

(where L1, L2, ..., and Lk are primes and Lk=L) is satisfied (S919), the elliptic curve order computing unit 504 increases L to the next prime (S921) and returns to step S911.

If the inequality in step S919 is not satisfied, the elliptic curve order computing unit 504 determines the order m according to the match & sort algorithm and writes the order m into the information storing unit 507 (S920).

2.3. Operation of Computing t mod $L^n$ by the Elliptic Curve Order Computing Unit 504

Figure 9:
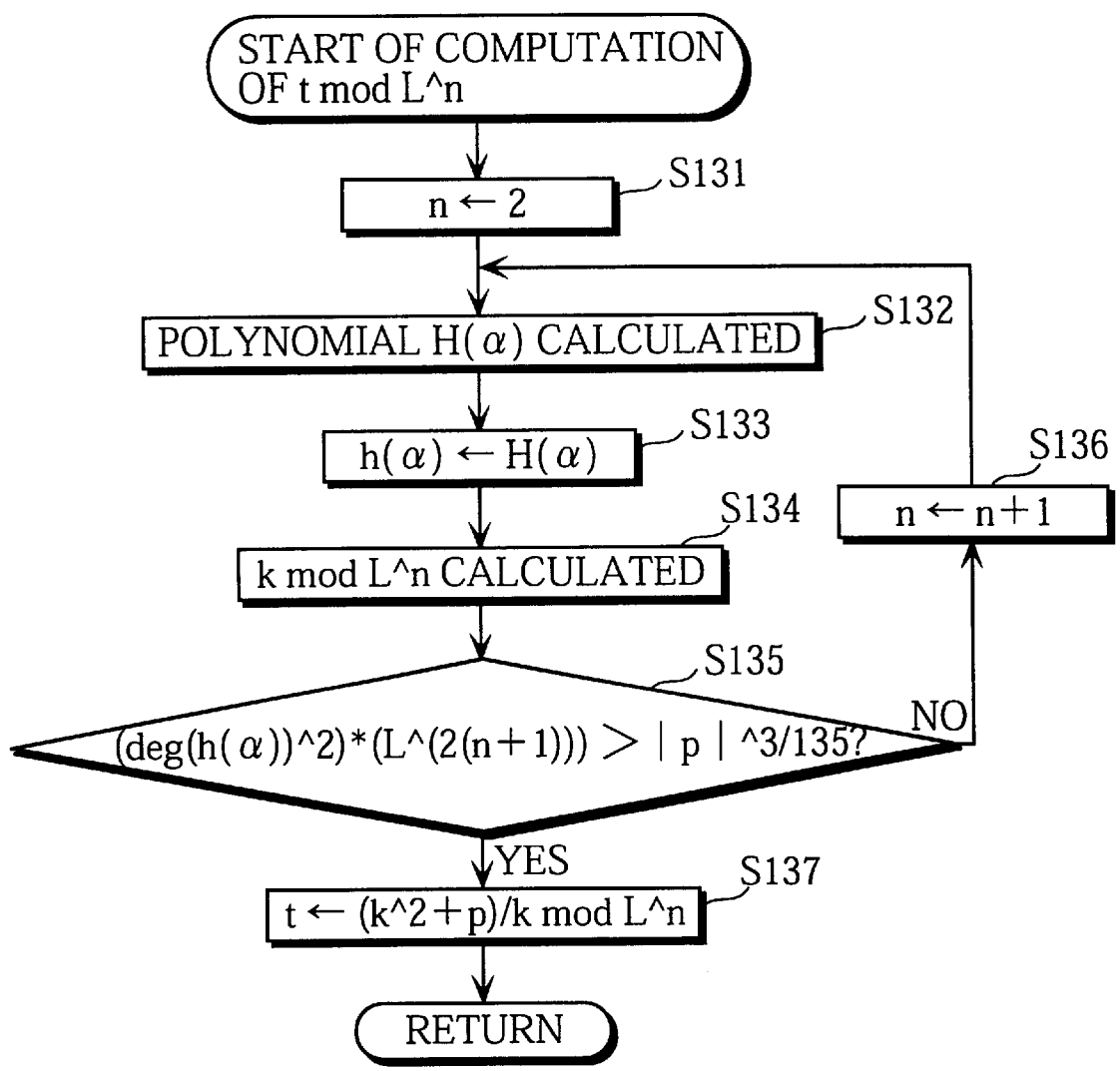
FIG. 9 is a flowchart showing the procedure of computing t mod L^n by the elliptic curve order computing unit 504.

The operation of computing t mod $L^n$ by the elliptic curve order computing unit 504 is explained below with reference to FIG. 9.

In Case 1, the elliptic curve order computing unit 504 first sets n=2 (S131), computes a polynomial H(α) based on k mod L and h(α) (S132), and assigns the outcome to h(α) (S133). The elliptic curve order computing unit 504 then computes k mod L^n using the polynomial h(α) (S134) and decides based on the degree of the polynomial h(α) whether to proceed to the next step.

Assuming that the degree of h(α) is denoted by deg(h(α)), it is judged whether $$(deg(h)^2)*L^2*(L^*(2*n))>(|p|)^3/135$$

where |p| represents the number of bits of p (S135). If this inequality is true, the elliptic curve order computing unit 504 defines $$t=(k^2+p)/k \bmod L^n$$

(S137) and completes the isogeny cycle. If the inequality is false, the elliptic curve order computing unit 504 adds 1 to n (S136) and repeats steps S132~S135 until the inequality is satisfied.

As a result, t mod L^n is obtained.

Although the same computation as in Case 1 is carried out in Case 2, in Case 2 the isogeny cycle algorithm might not be applicable. Therefore, in Case 2 the elliptic curve order computing unit 504 tests whether the isogeny cycle algorithm is applicable prior to the computation of t mod L^n (see FIG. 8).

2.4. Doubling or Addition of Points on the Elliptic Curve E by the Elliptic Curve Order Computing Unit 504

To compute an exponentiation point kP on the elliptic curve E, the elliptic curve order computing unit 504 first splits the computation of kP into doublings and additions on the elliptic curve E, and performs the doublings and the additions in accordance with the procedure given below. Here, the type of the arithmetic operation (i.e. doubling or addition) to be performed and the affine coordinates of one or two elliptic curve points which are subjected to the arithmetic operation are given in advance of the procedure. By repeating the following procedure for all of the doublings and additions, the exponentiation point kP is obtained.

The elliptic curve arithmetic operation on the elliptic curve E by the elliptic curve order computing unit 504 is explained below with reference to FIG. 10.

The elliptic curve order computing unit 504 performs a doubling or an addition on the elliptic curve E: y^2=f(x) over the residue class ring, modulo polynomials β^2−f(α) and h(α), of polynomials in two variables α and β (where f(α)=α^3+aα+b, a and b are constants, and h(α) is a polynomial in the variable and α), in the following way.

The elliptic curve order computing unit 504 receives operation information indicating addition and the affine coordinates of two different points on the elliptic curve E which are subjected to the addition, or receives operation information indicating doubling and the affine coordinates of a single point on the elliptic curve E which is subjected to the doubling. Let $$(X1(\alpha), \beta \times Y1(\alpha))$$

$$(X2(\alpha), \beta \times Y2(\alpha))$$

be the affine coordinates of the two different points on the elliptic curve E, and $$(X1(\alpha), \beta \times Y1(\alpha))$$

be the affine coordinates of the single point on the elliptic curve E (S121).

The elliptic curve order computing unit 504 transforms the received affine coordinates into projective coordinates. The transformation is carried out by converting the affine coordinates (φ(α),β×Φ(α)) (Φ(α) and Φ(α) polynomials) of some point on the elliptic curve E using polynomials $$X(\alpha)=f(\alpha) \times \phi(\alpha)$$

$$Y(\alpha)=f(\alpha)^2 \times \Phi(\alpha)$$

$$Z(\alpha)=1$$

and so generating the projective coordinates (X(α):Y(α):β×Z(α)). In the present example, the affine coordinates of the two different points are transformed into the projective coordinates $$(X1(\alpha):Y1(\alpha):\beta \times Z1(\alpha))$$

$$(X2(\alpha):Y2(\alpha):\beta \times Z2(\alpha))$$

and the affine coordinates of the single point are transformed into the projective coordinates $$(X1(\alpha):Y1(\alpha):\beta Z1(\alpha))$$

(S122).

The elliptic curve order computing unit 504 then checks whether the received operation information indicates addition or doubling (S123). If addition is indicated, the elliptic curve order computing unit 504 computes $$U1(\alpha)=X1(\alpha) \times Z2(\alpha)^2$$

$$U2(\alpha)=X2(\alpha) \times Z1(\alpha)^2$$

$$S1(\alpha)=Y1(\alpha) \times Z2(\alpha)^3$$

$$S2(\alpha)=Y2(\alpha) \times Z1(\alpha)^3$$

$$H(\alpha)=U2(\alpha)-U1(\alpha)$$

$$r(\alpha)=S2(\alpha)-S1(\alpha)$$

(S124) and computes $$X3(\alpha)=-H(\alpha)^3-2 \times U1(\alpha) \times H(\alpha)^2+r(\alpha)^2$$

$$Y3(\alpha)=-S1(\alpha) \times H(\alpha)^3+r(\alpha) \times (U1(\alpha) \times H(\alpha)^2-X3(\alpha))$$

$$Z3(\alpha)=Z1(\alpha) \times Z2(\alpha) \times H(\alpha)$$

(S125).

If, on the other hand, doubling is indicated, the elliptic curve order computing unit 504 computes $$S(\alpha)=4 \times X1(\alpha) \times Y1(\alpha)^2$$

$$M(\alpha)=3 \times X1(\alpha)^2+a \times Z1(\alpha)^4 \times f(\alpha)^2$$

$$T(\alpha)=-2 \times S(\alpha)+M(\alpha)^2$$

(S126) and computes $$X3(\alpha)=T(\alpha)$$

$$Y3(\alpha)=-8 \times Y1(\alpha)^4+M(\alpha) \times (S(\alpha)-T(\alpha))$$

$$Z3(\alpha)=2 \times Y1(\alpha) \times Z1(\alpha)$$

(S127).

Lastly, the elliptic curve order computing unit 504 outputs the projective coordinates (X3(α):Y3(α):β×Z3(α)) (S128).

3. Conclusion

As described above, the elliptic curve setting unit 502 is likely to choose a secure elliptic curve beforehand, so that the processes of choosing an elliptic curve and testing its security do not have to be repeated over and over again. Accordingly, overall computational complexity in the elliptic curve construction device 500 is reduced.

Also, the elliptic curve finitude judging unit 503 assesses the security of the elliptic curve by checking whether the elliptic curve contains a point with a finite order, prior to the computation of the elliptic curve order. Since the elliptic curve which is judged as not secure is rejected at this stage, unnecessary calculation of the order of such an elliptic curve is avoided, with it being possible to reduce the overall computational complexity in the elliptic curve construction device 500.

Also, in computation of the exponentiation point kP on the elliptic curve by the elliptic curve order computing unit 504, doubling is more frequently repeated than addition. In general, computational complexity to compute kP according to the signed binary window method can be expressed as $$|k| \times (ED + EA/3)$$

where EA denotes the computational complexity of an addition, ED denotes the computational complexity of a doubling, and $|k|$ denotes the number of bits of k. With the signed binary window method, computational complexity for finding kP according to the invention is $15.3 \times PMul \times |k|$, whereas computational complexity for finding kP according to prior art example 3 is $17 \times PMul \times |k|$. As a result, the overall computational complexity is further reduced according to the invention.

4. Modifications

Although the elliptic curve construction device according to the invention has been explained based on the embodiment, the invention is not limited to such. For example, the following modifications are possible.

(1) The invention may be an elliptic curve application device provided with the elliptic curve construction device described above. Examples of such an elliptic curve application device are an encrypted communication system made up of an encryption device and a decryption device, a digital signature system made up of a, digital signature device and a signature verification device, and an error-correction communication system made up of an error-correction code transmission device and an error correction device.

The encrypted communication system uses elliptic curves to perform communication without the communicated content being revealed to third parties. The digital signature system uses elliptic curves to enable the receiver to verify whether the communicated content is valid or whether the information is from the stated sender. The error-correction communication system uses elliptic curves to recover original information from information which has been altered or lost while it was being transmitted on a communication line.

(2) Though the elliptic curve setting unit 502 has set the parameters a and b of the elliptic curve E: $y^2 = x^3 + ax + b$ respectively as $a = -3$ and $b = t$, the parameters a and b may instead be set in the following fashion.

The elliptic curve setting unit 502 defines the above shown discriminant TD against the elliptic curve E: $y^2 = x^3 + ax + b$ (a and b are integers) on the rational number field and sets the parameters a and b such that the probability of the discriminant TD having a square factor will end up being lower than a predetermined threshold value. As an example, the predetermined threshold value is 0.001. By doing so, the chance that a secure elliptic curve is formed increases, as explained in the above embodiment.

(3) The invention may be an elliptic curve arithmetic operation device for performing elliptic curve arithmetic operations for points on the elliptic curve defined over the polynomial residue class ring, as embodied by the elliptic curve order computing unit 504.

(4) The invention may be an elliptic curve order computation device for computing the order of the elliptic curve, as embodied by the elliptic curve order computing unit 504.

(5) The invention may be an elliptic curve arithmetic operation method, an elliptic curve order computation method, or an elliptic curve construction method shown in the embodiment.

Also, the invention may by a computer program that implements the elliptic curve arithmetic operation method, the elliptic curve order computation method, or the elliptic curve construction method on a computer, or digital signals that compose such a computer program.

Further, the invention may be a computer-readable storage medium, such as a floppy disk, a hard disk, a CD-ROM (compact disk read only memory), an MO (magneto-optical disk), a DVD (digital versatile disk), a DVD-ROM, a DVD-RAM, or a semiconductor memory, that stores the computer program or the digital signals. Likewise, the invention may be the computer program or digital signals stored in such a storage medium.

The invention can also be realized by transferring the computer program or the digital signals via a network such as a telecommunication network, a radio or cable communication network, or the Internet.

(6) Various combinations of the embodiment and the modifications stated above, as well as combinations of the modifications themselves, are possible.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An elliptic curve construction device for determining parameters of an elliptic curve E which is defined over a finite field GF(p) and offers a high level of security, p being a prime, the elliptic curve construction device comprising:

random number generating means for generating a random number;

parameter generating means for selecting the parameters of the elliptic curve E using the generated random number, in such a manner that a probability of a discriminant of the elliptic curve E having any square factor is lower than a predetermined threshold value;

finitude judging means for judging whether the elliptic curve E defined by the selected parameters has any point whose order is finite on a rational number field;

order computer means for computing an order m of the elliptic curve E when the finitude judging means judges that the elliptic curve E does not have any point whose order is finite on the rational number field;

security judging means for judging whether a condition that the computed order m is a prime not equal to the prime p is satisfied;

repeat controlling means for controlling the random number generating means, the parameter generating means, the finitude judging means, the order computing means, and the security judging means respectively to repeat random number generation, parameter selection, finitude judgement, order computation, and security judgement until the condition is satisfied, and parameter outputting means for outputting the selected parameters when the condition is satisfied.

2. The elliptic curve construction device of claim 1,
wherein the elliptic curve E is expressed as $y^2=x^3+ax+b$, where parameters a and b are constants, and
wherein the parameter generating means selects −3 and the random number respectively as the parameters a and b so that the probability of the discriminant of the elliptic curve E having any square factor is lower than the predetermined threshold value.

3. The elliptic curve construction device of claim 2,
wherein the finitude judging means, given two primes p1 and p2 beforehand where p1≠p2, interprets the elliptic curve E as an elliptic curve EQ on the rational number field, computes orders m1 and m2 of respective elliptic curves Ep1 and Ep2 which are produced by reducing the elliptic curve EQ modulo p1 and p2, judges whether the orders m1 and m2 are relatively prime, and, if the orders m1 and m2 are relatively prime, judges that the elliptic curve E does not have any point whose order is finite on the rational number field.

4. The elliptic curve construction device of claim 3,
wherein the finitude judging means, given the primes p1=5 and p2=7 beforehand, computes the orders m1 and m2 of the respective elliptic curves Ep1 and Ep2 produced by reducing the elliptic curve EQ modulo p1=5 and p2=7.

5. The elliptic curve construction device of claim 3,
wherein the order computing means computes the order m of the elliptic curve E according to a Schoof-Elkies-Atkin algorithm and includes elliptical curve arithmetic operating means for performing one of an addition and a doubling on the elliptic curve E: $y^2=f(x)$ on a residue class ring of polynomials in variables α and β, moduli of the residue class ring being polynomials $\beta^2-f(\alpha)$ and h(α), where $f(\alpha)=\alpha^3+a\alpha b$ and h(α) is a polynomial in the variable α, wherein the elliptic curve arithmetic operating means includes an elliptic curve arithmetic operation device which includes acquiring means for acquiring affine coordinates of at least one point on the elliptic curve E and operation information indicating one of the addition and the doubling, from an external source;

transforming means for performing a coordinate transformation on the acquired affine coordinates to generate Jacobian coordinates, the coordinate transformation being transforming affine coordinates (φ(α),β×Φ(α)) of a given point on the elliptic curve E using polynomials $X(\alpha)=f(\alpha)\times\phi(\alpha)$ $Y(\alpha)=f(\alpha)^2\times\Phi(\alpha)$ $Z(\alpha)=1$ into Jacobian coordinates (X(α):Y(α):β×Z(α)), φ(α) and Φ(α) being polynomials, and operating means for performing one of the addition and the doubling indicated by the acquired operation information, on the generated Jacobian coordinates to obtain Jacobian coordinates of a point on the elliptic curve E.

6. The elliptic curve construction device of claim 5,
wherein the elliptic curve arithmetic operating means includes an elliptic curve arithmetic operation device wherein the acquiring means
(a) in a first case acquires affine coordinates of two different points on the elliptic curve E and operation information indicating the addition, and
(b) in a second case acquires affine coordinates of a single point on the elliptic curve E and operation information indicating the doubling,
wherein the transforming means
(a) in the first case performs the coordinate transformation on the acquired affine coordinates of the two different points to generate Jacobian coordinates of the two different points, and
(b) in the second case performs the coordinate transformation on the acquired affine coordinates of the single point to generate Jacobian coordinates of the single point, and
wherein the operating means
(a) in the first case performs the addition indicated by the acquired operation information on the generated Jacobian coordinates of the two different points to obtain the Jacobian coordinates of the point on the elliptic curve E, and
(b) in the second case performs the doubling indicated by the acquired operation information on the generated Jacobian coordinates of the single point to obtain the Jacobian coordinates of the point on the elliptic curve E.

7. The elliptic curve construction device of claim 6,
wherein the elliptic curve arithmetic operating means includes an elliptic curve arithmetic operation device wherein the acquiring means
(a) in the first case acquires affine coordinates (X1(α),β×Y1(α))

(X2(α),β×Y2(α))

of the two different points on the elliptic curve E and the operation information indicating the addition, and (b) in the second case acquires affine coordinates (X1(α),β×Y1(α))

of the single point on the elliptic curve E and the operation information indicating the doubling, wherein the transforming means
(a) in the first case performs the coordinate transformation on the acquired affine coordinates of the two different points to generate Jacobian coordinates (X1(α):Y1(α):β×Z1(α))

(X2(α):Y2(α):β×Z2(α))

of the two different points, and
(b) in the second case performs the coordinate transformation on the acquired affine coordinates of the single point to generate Jacobian coordinates (X1(α):Y1(α):β×Z1(α))

of the single point, and wherein the operating means
(a) in the first case computes $$U1(\alpha)=X1(\alpha)\times Z2(\alpha)^2$$

$$U2(\alpha)=X2(\alpha)\times Z1(\alpha)^2$$

$$S1(\alpha)=Y1(\alpha)\times Z2(\alpha)^3$$

$$S2(\alpha)=Y2(\alpha)\times Z1(\alpha)^3$$

$$H(\alpha)=U2(\alpha)-U1(\alpha)$$

$$r(\alpha)=S2(\alpha)-S1(\alpha)$$

and computes $$X3(\alpha)=-H(\alpha)^3-2\times U1(\alpha)\times H(\alpha)^2+r(\alpha)^2$$

$$Y3(\alpha)=-S1(\alpha)\times H(\alpha)^3+r(\alpha)\times(U1(\alpha)\times H(\alpha)^2-X3(\alpha))$$

$$Z3(\alpha)=Z1(\alpha)\times Z2(\alpha)\times H(\alpha)$$

to obtain Jacobian coordinates $(X3(\alpha):Y3(\alpha):\beta\times Z3(\alpha))$ of the point on the elliptic curve E, and
(b) in the second case computes $$S(\alpha)=4\times X1(\alpha)\times Y1(\alpha)^2$$

$$M(\alpha)=3\times X1(\alpha)^2+a\times Z1(\alpha)^4\times f(\alpha)^2$$

$$T(\alpha)=-2\times S(\alpha)+M(\alpha)^2$$

and computes $$X3(\alpha)=T(\alpha)$$

$$Y3(\alpha)=-8\times Y1(\alpha)^4+M(\alpha)\times(S(\alpha)-T(\alpha))$$

$$Z3(\alpha)=2\times Y1(\alpha)\times Z1(\alpha)$$

to obtain the Jacobian coordinates $(X3(\alpha):Y3(\alpha):\beta\times Z3(\alpha))$ of the point on the elliptic curve E.

8. An elliptic curve application device that uses elliptic curves, comprising
elliptic curve construction means for determining parameters of an elliptic curve E which is defined over a finite field GF(p) and offers a high level of security, p being a prime,
wherein the elliptic curve constructing means includes an elliptic curve construction device which includes
random number generating means for generating a random number;
parameter generating means for selecting the parameters of the elliptic curve E
using the generated random number, in such a manner that a probability of a discriminant of the elliptic curve E having any square factor is lower than a predetermined threshold value;
finitude judging means for judging whether the elliptic curve E defined by the selected parameters has any point whose order is finite on a rational number field;
order computer means for computing an order m of the elliptic curve E when the finitude judging means judges that the elliptic curve E does not have any point whose order is finite on the rational number field;
security judging means for judging whether a condition that the computed order m is a prime not equal to the prime p is satisfied;
repeat controlling means for controlling the random number generating means, the parameter generating means, the finitude judging means, the order computing means, and the security judging means respectively to repeat random number generation, parameter selection, finitude judgment, order computation, and security judgment until the condition is satisfied; and
parameter outputting means for outputting the selected parameters when the condition is satisfied.

9. The elliptic curve application device of claim 8,
wherein the elliptic curve constructing means includes an elliptic curve construction device
wherein the elliptic curve E is expressed as y^2=x^3+ax+b, where parameters a and b are constants, and
wherein the parameter generating means selects −3 and the random number respectively as the parameters a and b so that the probability of the discriminant of the elliptic curve E having any square factor is lower than the predetermined threshold value.

10. The elliptic curve application device of claim 9,
wherein the elliptic curve constructing means includes an elliptic curve construction device
wherein the finitude judging means, given two primes p1 and p2 beforehand where p1≠p2, interprets the elliptic curve E as an elliptic curve EQ on the rational number field, computes orders m1 and m2 of respective elliptic curves Ep1 and Ep2 which are produced by reducing the elliptic curve EQ modulo p1 and p2, judges whether the orders m1 and m2 are relatively prime, and, if the orders m1 and m2 are relatively prime, judges that the elliptic curve E does not have any point whose order is finite on the rational number field.

11. The elliptic curve application device of claim 10,
wherein the elliptic curve constructing means includes an elliptic curve construction device
wherein the finitude judging means, given the primes p1=5 and p2=7 beforehand, computes the orders m1 and m2 of the respective elliptic curves Ep1 and Ep2 produced by reducing the elliptic curve EQ modulo p1=5 and p2=7.

12. The elliptic curve application device of claim 10,
wherein the elliptic curve constructing means includes an elliptic curve construction device
wherein the order computing means computes the order m of the elliptic curve E according to a Schoof-Elkies-Atkin algorithm and includes
elliptical curve arithmetic operating means for performing one of an addition and a doubling on the elliptic curve E: y^2=(x) on a residue class ring of polynomials in variables α and β, moduli of the residue class ring being polynomials $\beta^2-f(\alpha)$ and $h(\alpha)$, where $f(\alpha)=\alpha^3+a\alpha+b$ and $h(\alpha)$ is a polynomial in the variable α,
wherein the elliptic curve arithmetic operating means includes an elliptic curve arithmetic operation device which includes
acquiring means for acquiring affine coordinates of at least one point on the elliptic curve E and operation information indicating one of the addition and the doubling, from an external source;
transforming means for performing a coordinate transformation on the acquired affine coordinates to generate Jacobian coordinates, the coordinate transformation being transforming affine coordinates $(\phi(\alpha),\beta\times\Phi(\alpha))$ of a given point on the elliptic curve E using polynomials $$X(\alpha)=f(\alpha)\times\phi(\alpha)$$

$$Y(\alpha)=f(\alpha)^2\times\Phi(\alpha)$$

$$Z(\alpha)=1$$

into Jacobian coordinates $(X(\alpha):Y(\alpha):\beta\times Z(\alpha))$, $\phi(\alpha)$ and $\Phi(\alpha)$ being polynomials, and
operating means for performing one of the addition and the doubling indicated by the acquired operation information, on the generated Jacobian coordinates to obtain Jacobian coordinates of a point on the elliptic curve E.

13. The elliptic curve application device of claim 12,
wherein the elliptic curve constructing means includes an elliptic curve construction device
wherein the elliptic curve arithmetic operating means includes an elliptic curve arithmetic operation device
wherein the acquiring means
  (a) in a first case acquires affine coordinates of two different points on the elliptic curve E and operation information indicating the addition, and
  (b) in a second case acquires affine coordinates of a single point on the elliptic curve E and operation information indicating the doubling,
wherein the transforming means
  (a) in the first case performs the coordinate transformation on the acquired affine coordinates of the two different points to generate Jacobian coordinates of the two different points, and
  (b) in the second case performs the coordinate transformation on the acquired affine coordinates of the single point to generate Jacobian coordinates of the single point, and
wherein the operating means
  (a) in the first case performs the addition indicated by the acquired operation information on the generated Jacobian coordinates of the two different points to obtain the Jacobian coordinates of the point on the elliptic curve E, and
  (b) in the second case performs the doubling indicated by the acquired operation information on the generated Jacobian coordinates of the single point to obtain the Jacobian coordinates of the point on the elliptic curve E.

14. The elliptic curve application device of claim 13,
wherein the elliptic curve constructing means includes an elliptic curve construction device
wherein the elliptic curve arithmetic operating means includes an elliptic curve arithmetic operation device
wherein the acquiring means
  (a) in the first case acquires affine coordinates $(X1(\alpha), \beta \times Y1(\alpha))$ $(X2(\alpha), \beta \times Y2(\alpha))$ of the two different points on the elliptic curve E and the operation information indicating the addition, and
  (b) in the second case acquires affine coordinates $(X1(\alpha), \beta \times Y1(\alpha))$ of the single point on the elliptic curve E and the operation information indicating the doubling,
wherein the transforming means
  (a) in the first case performs the coordinate transformation on the acquired affine coordinates of the two different points to generate Jacobian coordinates $(X1(\alpha):Y1(\alpha):\beta \times Z1(\alpha))$ $(X2(\alpha):Y2(\alpha):\beta \times Z2(\alpha))$ of the two different points, and
  (b) in the second case performs the coordinate transformation on the acquired affine coordinates of the single point to generate Jacobian coordinates $(X1(\alpha):Y1(\alpha):\beta Z1(\alpha))$ of the single point, and
wherein the operating means
  (a) in the first case computes $U1(\alpha)=X1(\alpha) \times Z2(\alpha)^2$ $U2(\alpha)=X2(\alpha) \times Z1(\alpha)^2$ $S1(\alpha)=Y1(\alpha) \times Z2(\alpha)^3$ $S2(\alpha)=Y2(\alpha) \times Z1(\alpha)^3$ $H(\alpha)=U2(\alpha)-U1(\alpha)$ $r(\alpha)=S2(\alpha)-S1(\alpha)$ and computes $X3(\alpha)=-H(\alpha)^3-2 \times U1(\alpha) \times H(\alpha)^2+r(\alpha)^2$ $Y3(\alpha)=-S1(\alpha) \times H(\alpha)^3+r(\alpha) \times (U1(\alpha) \times H(\alpha)^2-X3(\alpha))$ $Z3(\alpha)=Z1(\alpha) \times Z2(\alpha) \times H(\alpha)$ to obtain Jacobian coordinates $(X3(\alpha):Y3(\alpha):\beta \times Z3(\alpha))$ of the point on the elliptic curve E, and
  (b) in the second case computes $S(\alpha)=4 \times X1(\alpha) \times Y1(\alpha)^2$ $M(\alpha)=3 \times X1(\alpha)^2+a \times Z1(\alpha)^4 \times f(\alpha)^2$ $T(\alpha)=-2 \times S(\alpha)+M(\alpha)^2$ and computes $X3(\alpha)=T(\alpha)$ $Y3(\alpha)=-8 \times Y1(\alpha)^4+M(\alpha) \times (S(\alpha)-T(\alpha))$ $Z3(\alpha)=2 \times Y1(\alpha) \times Z1(\alpha)$ to obtain the Jacobian coordinates $(X3(\alpha):Y3(\alpha):\beta \times Z3(\alpha))$ of the point on the elliptic curve E.

15. An elliptic curve construction method used in an elliptic curve construction device equipped with random number generating means, parameter generating means, finitude judging means, order computing means, security judging means, repeat controlling means, and parameter outputting means, for determining parameters of an elliptic curve E which is defined over a finite field GF(p) and offers a high level of security, p being a prime, the elliptic curve construction method comprising:

a random number generating step performed by the random number generating means, for generating a random number;

a parameter generating step performed by the parameter generating means, for selecting the parameters of the elliptic curve E using the generated random number, in such a manner that a probability of a discriminant of the elliptic curve E having any square factor is lower than a predetermined threshold value;

a finitude judging step performed by the finitude judging means, for judging whether the elliptic curve E defined by the selected parameters has any point whose order is finite on a rational number field;

an order computing step performed by the order computer means, for computing an order m of the elliptic curve E when the finitude judging step judges that the elliptic curve E does not have any point whose order is finite on the rational number field;

a security judging step performed by the security judging means, for judging whether a condition that the computed order m is a prime not equal to the prime P is satisfied;

a repeat controlling step performed by the repeat controlling means, for controlling the random number generating step, the parameter generating step, the finitude judging step, the order computing step, and the security judging step respectively to repeat random number generation, parameter selection, finitude judgement, order computation, and security judgement until the condition is satisfied; and a parameter outputting step performed by the parameter outputting means for outputting the selected parameters when the condition is satisfied.

16. A computer-readable storage medium storing an elliptic curve construction program used in an elliptic curve construction device equipped with random number generating means, parameter generating means, finitude judging means, order computing means, security judging means, repeat controlling means, and parameter outputting means, for determining parameters of an elliptic curve E which is defined over a finite field GF(p) and offers a high level of security, p being a prime, the elliptic curve construction program comprising:

a random number generating step performed by the random number generating means, for generating a random number;

a parameter generating step performed by the parameter generating means, for selecting the parameters of the elliptic curve E using the generated random number, in such a manner that a probability of a discriminant of the elliptic curve E having any square factor is lower than a predetermined threshold value;

a finitude judging step performed by the finitude judging means, for judging whether the elliptic curve E defined by the selected parameters has any point whose order is finite on a rational number field;

an order computing step performed by the order computer means, for computing an order m of the elliptic curve E when the finitude judging step judges that the elliptic curve E does not have any point whose order is finite on the rational number field;

a security judging step performed by the security judging means, for judging whether a condition that the computed order m is a prime not equal to the prime p is satisfied;

a repeat controlling step performed by the repeat controlling means for controlling the random number generating step, the parameter generating step, the finitude judging step, the order computing step, and the security judging step respectively to repeat random number generation, parameter selection, finitude judgement, order computation, and security judgement until the condition is satisfied; and a parameter outputting step performed by the parameter outputting means for outputting the selected parameters when the condition is satisfied.

17. The storage medium of claim 16, wherein the elliptic curve E is expressed as $y^2=x^3+ax+b$, where parameters a and b are constants, and wherein the parameter generating step selects −3 and the random number respectively as the parameters a and b so that the probability of the discriminant of the elliptic curve E having any square factor is lower than the predetermined threshold value.

18. The storage medium of claim 17, wherein the finitude judging step, given two primes p1 and p2 beforehand where p1≠p2, interprets the elliptic curve E as an elliptic curve EQ on the rational number field, computes orders m1 and m2 of respective elliptic curves Ep1 and Ep2 which are produced by reducing the elliptic curve EQ modulo p1 and p2, judges whether the orders m1 and m2 are relatively prime, and, if the orders m1 and m2 are relatively prime, judges that the elliptic curve E does not have any point whose order is finite on the rational number field.

19. The storage medium of claim 18, wherein the finitude judging step, given the primes p1=5 and p2=7 beforehand, computes the orders m1 and m2 of the respective elliptic curves Ep1 and Ep2 produced by reducing the elliptic curve EQ modulo p1=5 and p2=7.

20. An elliptic curve construction apparatus for determining parameters of an elliptic curve E which is defined over a finite field GF(p) and offers a high level of security, p being a prime, the elliptic curve construction apparatus comprising:

random number generating unit for generating a random number;

parameter generating unit for selecting the parameters of the elliptic curve E using the generated random number, in such a manner that a probability of a discriminant of the elliptic curve E having any square factor is lower than a predetermined threshold value;

finitude judging unit for judging whether the elliptic curve E defined by the selected parameters has any point whose order is finite on a rational number field;

order computer unit for computing an order m of the elliptic curve E when the finitude judging unit judges that the elliptic curve E does not have any point whose order is finite on the rational number field;

security judging unit for judging whether a condition that the computed order m is a prime not equal to the prime p is satisfied;

repeat controlling unit for controlling the random number generating unit, the parameter generating unit, the finitude judging unit, the order computing unit, and the security judging unit respectively to repeat random number generation, parameter selection, finitude judgement, order computation, and security judgement until the condition is satisfied; and parameter outputting unit for outputting the selected parameters when the condition is satisfied.

21. The elliptic curve construction apparatus of claim 20, wherein the elliptic curve E is expressed $y^2=x^3+ax+b$, where parameters a and b are constants, and wherein the parameter generating unit selects −3 and the random number respectively as the parameters a and b so that the probability of the discriminant of the elliptic curve E having any square factor is lower than the predetermined threshold value.

22. The elliptic curve construction apparatus of claim 20, wherein the finitude judging unit, given two primes p1 and p2 beforehand where p1≠p2, interprets the elliptic curve E as an elliptic curve EQ on the rational number field, computes orders m1 and m2 of respective elliptic curves Ep1 and Ep2 which are produced by reducing the elliptic curve EQ modulo p1 and p2, judges whether the orders m1 and m2 are relatively prime, and, if the orders m1 and m2 are relatively prime, judges that the elliptic curve E does not have any point whose order is finite on the rational number field.

23. The elliptic curve construction apparatus of claim 20, wherein the finitude judging unit, given the primes p1=5 and p2=7 beforehand, computes the orders m1 and m2 of the respective elliptic curves Ep1 and Ep2 produced by reducing the elliptic curve EQ modulo p1=5 and p2=7.

24. The elliptic curve construction apparatus of claim 20, wherein the parameter generating unit selects parameters of the elliptic curve E in such a manner that the probability of the discriminant of the elliptic curve E having any square factor is lower than 0.001.

* * * * *